United States Patent
Henry et al.

(10) Patent No.: US 11,455,895 B2
(45) Date of Patent: Sep. 27, 2022

(54) ROOF SCAN USING UNMANNED AERIAL VEHICLE

(71) Applicant: Skydio, Inc., Redwood City, CA (US)

(72) Inventors: Peter Henry, San Francisco, CA (US); Jack Zhu, San Francisco, CA (US); Brian Richman, San Francisco, CA (US); Harrison Zheng, Palo Alto, CA (US); Hayk Martirosyan, San Francisco, CA (US); Matthew Donahoe, Redwood City, CA (US); Abraham Galton Bachrach, Redwood City, CA (US); Adam Bry, Redwood City, CA (US)

(73) Assignee: Skydio, Inc., Redwood City, CA (US)

( * ) Notice: Subject to any disclaimer, the term of this patent is extended or adjusted under 35 U.S.C. 154(b) by 302 days.

(21) Appl. No.: 16/987,336

(22) Filed: Aug. 6, 2020

(65) Prior Publication Data
US 2021/0125503 A1  Apr. 29, 2021

Related U.S. Application Data

(60) Provisional application No. 62/926,787, filed on Oct. 28, 2019.

(51) Int. Cl.
*G08G 5/00* (2006.01)
*G06F 3/04845* (2022.01)
(Continued)

(52) U.S. Cl.
CPC .......... *G08G 5/003* (2013.01); *B64C 39/024* (2013.01); *B64D 47/08* (2013.01); *G01S 13/89* (2013.01);
(Continued)

(58) Field of Classification Search
CPC ......... G05D 2201/0207; G05D 1/0094; G05D 1/102; H04N 13/204; H04N 13/271;
(Continued)

(56) References Cited

U.S. PATENT DOCUMENTS 9,881,213 B2 * 1/2018 Michini ............. G06Q 10/1097
9,886,632 B1 * 2/2018 Loveland ............... G09B 9/302
(Continued)

FOREIGN PATENT DOCUMENTS

WO  2019026169 A1  2/2019

OTHER PUBLICATIONS

International Preliminary Report on Patentability, dated May 12, 2022 in corresponding PCT Application No. PCT/US2020/057616.
(Continued)

*Primary Examiner* — Muhammad Shafi
(74) *Attorney, Agent, or Firm* — Young Basile Hanlon & MacFarlane, P.C.

(57) ABSTRACT

Described herein are systems for roof scan using an unmanned aerial vehicle. For example, some methods include capturing, using an unmanned aerial vehicle, an overview image of a roof of a building from above the roof; presenting a suggested bounding polygon overlaid on the overview image to a user; determining a bounding polygon based on the suggested bounding polygon and user edits; based on the bounding polygon, determining a flight path including a sequence of poses of the unmanned aerial vehicle with respective fields of view at a fixed height that collectively cover the bounding polygon; fly the unmanned aerial vehicle to a sequence of scan poses with horizontal positions matching respective poses of the flight path and vertical positions determined to maintain a consistent dis-
(Continued)

tance above the roof; and scanning the roof from the sequence of scan poses to generate a three-dimensional map of the roof.

20 Claims, 18 Drawing Sheets

(51) Int. Cl.
  *G06F 3/04817*  (2022.01)
  *G06T 17/05*  (2011.01)
  *G06T 19/00*  (2011.01)
  *G06F 3/04847*  (2022.01)
  *B64C 39/02*  (2006.01)
  *B64D 47/08*  (2006.01)
  *G05D 1/10*  (2006.01)
  *G05D 1/00*  (2006.01)
  *G08G 5/04*  (2006.01)
  *G01S 13/89*  (2006.01)
  *G01S 17/89*  (2020.01)
  *H04N 5/272*  (2006.01)
  *G06T 17/10*  (2006.01)
  *G06V 20/13*  (2022.01)
  *G06V 20/10*  (2022.01)
  *H04N 13/204*  (2018.01)

(52) U.S. Cl.
  CPC ............ *G01S 17/89* (2013.01); *G05D 1/0016* (2013.01); *G05D 1/0038* (2013.01); *G05D 1/106* (2019.05); *G06F 3/04817* (2013.01); *G06F 3/04845* (2013.01); *G06F 3/04847* (2013.01); *G06T 17/05* (2013.01); *G06T 17/10* (2013.01); *G06T 19/006* (2013.01); *G06V 20/13* (2022.01); *G06V 20/176* (2022.01); *G08G 5/04* (2013.01); *H04N 5/272* (2013.01); *B64C 2201/027* (2013.01); *B64C 2201/123* (2013.01); *B64C 2201/127* (2013.01); *B64C 2201/14* (2013.01); *B64C 2201/146* (2013.01); *G05D 2201/0207* (2013.01); *H04N 13/204* (2018.05)

(58) Field of Classification Search
  CPC . G01S 13/865; G01S 13/867; G06T 2210/12; G06T 19/00; G06V 20/17; G06V 20/647; G08G 5/0021; G08G 5/0034; G08G 5/0069; G08G 5/045
  USPC .......................................................... 701/15
  See application file for complete search history.

(56) References Cited

U.S. PATENT DOCUMENTS

| | | | |
|---|---|---|---|
| 10,061,470 B2* | 8/2018 | Richman | G05D 1/0038 |
| 10,102,428 B2* | 10/2018 | Loveland | G06Q 10/20 |
| 11,210,514 B2 | 12/2021 | Loveland et al. | |
| 2016/0180588 A1 | 6/2016 | Mason | |
| 2016/0321503 A1* | 11/2016 | Zhou | G06V 20/176 |
| 2017/0193297 A1* | 7/2017 | Michini | G06Q 10/063114 |
| 2017/0193829 A1* | 7/2017 | Bauer | B64D 47/08 |
| 2017/0206648 A1 | 7/2017 | Marra et al. | |
| 2018/0096541 A1 | 4/2018 | O'Brien et al. | |
| 2020/0103552 A1* | 4/2020 | Phelan | G01W 1/06 |
| 2020/0218286 A1* | 7/2020 | Tamasato | G01C 15/00 |

OTHER PUBLICATIONS

International Search Report and Written Opinion dated Feb. 17, 2021 in corresponding application No. PCT/US2020/057616.

* cited by examiner

ROOF SCAN USING UNMANNED AERIAL VEHICLE

CROSS REFERENCE TO RELATED APPLICATIONS

This application claims the benefit of U.S. Provisional Application No. 62/926,787, filed Oct. 28, 2019, the contents of each of which are incorporated by reference herein in their entirety.

TECHNICAL FIELD

This disclosure relates to roof scan using an unmanned aerial vehicle.

BACKGROUND

Unmanned aerial vehicles (e.g., a drone) can be used to capture images from vantage points that would otherwise be difficult to reach. The drones typically are operated by a human using a specialized controller to remotely control the movements and image capture functions of the unmanned aerial vehicle. Some automated image capture modes have been implemented, such as recording video while following a recognized user or a user carrying a beacon device as the user moves through and environment.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
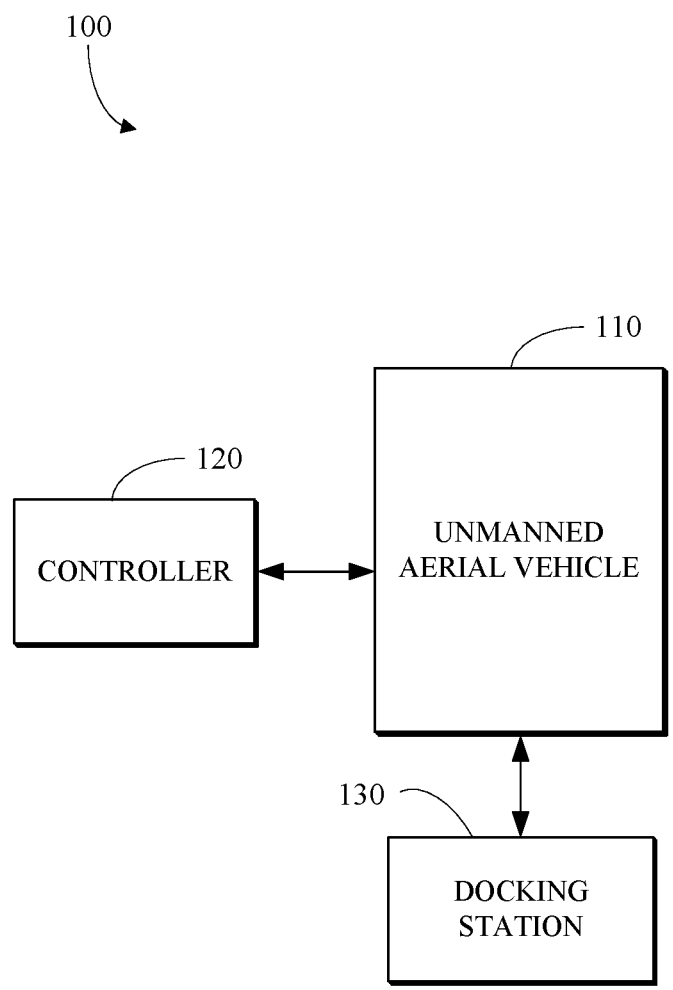
FIG. 1 is an illustration of an example of a system for roof scan using an unmanned aerial vehicle.

Much of the value and challenges of autonomous unmanned aerial vehicles lies in enabling robust, fully autonomous missions. Disclosed herein are techniques for scanning a roof in a thorough and repeatable manner using an unmanned aerial vehicle (UAV). Some implementations may provide advantages over earlier systems, such as: providing more consistent framing of roof scan images by maintaining consistent distance and orientation with respect to the section of the surface of the roof being imaged than can be achieved by manual control of the unmanned aerial vehicle, which may facilitate more robust detection of roof maintenance issues using machine learning or human review of the scan data; reduced need for human operator attention; and/or faster comprehensive scans of large roofs.

In some implementations, based on a user supplied rough bounding box of the roof of interest, an initial coarse scan with a range sensor (e.g., an array of image sensor configured for stereoscopic computer vision) is performed to obtain a three-dimensional map of the roof at a first resolution. Next a set of facets are generated based on the three-dimensional map. In some implementations, user feedback on the set of facets is solicited by presenting the facets in as two-dimensional polygon projections of the facets in an overview image (e.g., a frozen image) of the roof. The user may be enabled to edit two-dimensional polygons to make corresponding changes to the facets that exist in three dimensions. A scan plan is generated based on the set of facets, where the scan plan includes a sequence of poses for the unmanned aerial vehicle close to the surfaces being scanned and modeled by the facets. For example, the poses of scan plan may be orthographic and at a consistent distance in relation to the surfaces being scanned. The scan plan is then executed by maneuvering the UAV to the poses and capturing relatively high-resolution images of the facets, which can be stitched together. The captured images can be inspected in real-time or offline by a human or a trained machine learning module.

For large roofs, a scan plan can be executed over the course of multiple charge cycles of a battery of the UAV. This functionality is greatly enhanced using completely automated docking and charging in a specially marked dock.

Automated docking and charging may be used in conjunction with the capability to pause the scan plan after a pose in the sequence of poses and robustly localize at a next pose in the sequence of poses after the charging session is complete to perform large scans with human intervention. For example, localization at a next pose may be facilitated by using a robust visual inertial odometry (VIO) for high resolution localization and obstacle detection and avoidance.

In some implementations, during a setup phase, a user may initially set the unmanned aerial vehicle on the ground, pointing in the direction of a building with a roof to be scanned. The user may hit "takeoff" in a user interface of the unmanned aerial vehicle. The unmanned aerial vehicle takes off, moves in a diagonal direction to up and over the target house of interest, and flies up high enough to look directly downwards at the roof of the building below and capture all of the relevant area in the field of view.

A polygon is shown in the user interface, and the user can drag the vertices of the polygon to identify the area where the roof of interest lies for the scan. The user may then select an approximate height (e.g., relative to the ground) that defines the volume in which the roof of interest lies in three-dimensional space. Now a three-dimensional space where the scan will take place has been specified. A camera image may also be taken at this overview vantage point, and is used as a "frozen view-point" in the user interface. As the unmanned aerial vehicle continues to fly, closer to the roof, the image on the screen is frozen at the overview screen, but a three-dimensional render of the unmanned aerial vehicle may be drawn in the user interface, correctly in perspective to where the physical drone would be. This allows the user to see the unmanned aerial vehicle in the image, as well as the state of the geometry estimation and path planning in future steps.

For example, an unmanned aerial vehicle may be enabled to load data, either saved on the vehicle or stored on a user device, to continue progress from a previously unfinished scan or repeat a previously performed scan. In this case, the vehicle after reaching the overhead view the unmanned aerial vehicle can skip the explore phase and relocalize itself based on visual and inertial data. Relocalization may be enabled without requiring any global positioning service or visual fiducials/datums.

In an initial explore phase, after the three-dimensional bounding box is defined, a few points of interest from oblique views at the corners of a roof are generated and flown. The unmanned aerial vehicle may then fly a flight path (e.g., a dynamic surface-relative flight path) to get an initial three-dimensional map of the roof. This may be done by flying in a lawnmower back-and-forth pattern, while using a dynamic local obstacle map to fly a fixed altitude above the surface of the roof. Range information may be accumulated using stereo imaging into a single three-dimensional map of an entire roof. The lawnmower pattern grid size and height above the surface may be chosen to trade off getting a high-quality three-dimensional map (e.g., close to surface, many passes, fly slowly) against obtaining the map quickly (e.g., farther from surface, fewer passes, fly quickly). These techniques may enable flying an autonomous surface relative pattern to generate mapping data.

Software running on a processing apparatus in an unmanned aerial vehicle and/or on a controller for the UAV may be used to implement the roof scanning techniques described herein.

FIG. 1 is an illustration of an example of a system 100 for roof scan using an unmanned aerial vehicle 110. The system 100 includes an unmanned aerial vehicle 110, a controller 120, and a docking station 130. The controller 120 may communicate with the unmanned aerial vehicle 110 via a wireless communications link (e.g., via a WiFi network or a Bluetooth link) to receive video or images and to issue commands (e.g., take off, land, follow, manual controls, and/or commands related to conducting an autonomous or semi-autonomous scan of a roof). For example, the controller 120 may be the controller 250 of FIG. 2C. In some implementations, the controller includes a smartphone, a tablet, or a laptop running software configured to communicate with and control the unmanned aerial vehicle 110. For example, the system 100 may be used to implement the process 600 of FIG. 6. For example, the system 100 may be used to implement the process 700 of FIG. 7. For example, the system 100 may be used to implement the process 800 of FIG. 8. For example, the system 100 may be used to implement the process 900 of FIG. 9. For example, the system 100 may be used to implement the process 1000 of FIG. 10.

The unmanned aerial vehicle 110 includes a propulsion mechanism (e.g., including propellers and motors), one or more image sensors, and a processing apparatus. For example, the unmanned aerial vehicle 110 may be the unmanned aerial vehicle 200 of FIGS. 2A-B. For example, the unmanned aerial vehicle 110 may include the hardware configuration 400 of FIG. 4. The processing apparatus (e.g., the processing apparatus 410) may be configured to: access a three-dimensional map of a roof, wherein the three-dimensional map encodes a set of points in three-dimensional space on surfaces of the roof; generate one or more facets based on the three-dimensional map, wherein a given facet of the one or more facets is a polygon on a plane in three-dimensional space fit to a subset of the points in the three-dimensional map; generate a scan plan based on the one or more facets, wherein the scan plan includes a sequence of poses for the unmanned aerial vehicle 110 to assume to enable capture, using the one or more image sensors, of images of the roof at a consistent distance from each of the one or more facets; control the propulsion mechanism to cause the unmanned aerial vehicle 110 to fly to assume a pose corresponding to one of the sequence of poses of the scan plan; and capture, using the one or more image sensors, one or more images of the roof from the pose. The processing apparatus may further be configured to continue with execution of the scan plan by controlling the propulsion mechanism to cause the unmanned aerial vehicle 110 to fly to assume a pose corresponding to each of the sequence of poses of the scan plan; and capture, using the one or more image sensors, one or more images of the roof from each of these poses until images covering all of the one or more facets have been captured. In some implementations, the processing apparatus may be configured to stitch the captured images together to obtain a composite image of one or more surfaces of the roof. For example, stitching of the images may be performed based in part on out-of-band information associated with the images via a respective facet, such as three-dimensional map points associated with the facet or the boundaries of the one or more facets. For example, the sequence of poses of the scan plan may be for orthographic imaging of each of the one or more facets, such that an image sensor of the unmanned aerial vehicle (e.g., the image sensor 220) faces toward the facet along a normal to the surface of the facet.

In some implementations, the unmanned aerial vehicle 110 is configured generate a facet in part by soliciting user feedback and edits of suggested facets that are generated based on automated analysis of the three-dimensional map of the roof. For example, the processing apparatus of the unmanned aerial vehicle 110 may be configured to: capture, using the one or more image sensors, an overview image of the roof; generate a facet suggestion based on the three-dimensional map; determine a two-dimensional polygon as a convex hull of a subset of points of the three-dimensional map, the subset of points corresponding to the facet suggestion, as projected into an image plane of the overview image; present the two-dimensional polygon overlaid on the overview image; determine an edited two-dimensional polygon in the image plane of the overview image based on data indicating a user edit of the two-dimensional polygon; and determine one of the one or more facets based on the edited two-dimensional polygon. In some implementations, the processing apparatus is configured to: prior to presenting the two-dimensional polygon overlaid on the overview image, simplify the two-dimensional polygon by removing a convex edge from the two-dimensional polygon and extending edges of the two-dimensional polygon adjacent to the convex edge to a point at which the extended edges intersect each other. For example, the processing apparatus may be configured to check that removal of the convex edge increases area of the two-dimensional polygon by an amount less than a threshold. For example, the processing apparatus may be configured to check that removal of the convex edge increases perimeter of the two-dimensional polygon by an amount less than a threshold.

In some implementations, the unmanned aerial vehicle 110 is also used to generate the three-dimensional map of the roof by performing an initial coarse scan of the roof with a range sensor (e.g., an array of image sensors configured for stereoscopic computer vision, a radar sensor, and/or a lidar sensor). For example, the unmanned aerial vehicle 110 may include one or more image sensors that are configured to support stereoscopic imaging used to provide range data. For example, the processing apparatus may be configured to: control the propulsion mechanism to cause the unmanned aerial vehicle 110 to fly to a vicinity of the roof; and scan the roof using the one or more image sensors to generate the three-dimensional map. In some implementations, the roof is scanned to generate the three-dimensional map from a distance greater than the consistent distance used for facet imaging.

For example, the scan plan based on the generated facets may be presented to a user for approval before execution of the scan plan commences. In some implementations, the processing apparatus is configured to: capture, using the one or more image sensors, an overview image of the roof; present, to a user, a graphical representation of the scan plan overlaid on the overview image; and receive an indication of an approval of the scan plan from the user.

In some implementations, the scan plan may be dynamically updated during execution of the scan plan to adapt to dynamically detected obstacles or occlusions and to exploit higher resolution sensor data that becomes available as the unmanned aerial vehicle 110 gets close to the surface(s) of the roof represented by a facet. For example, the processing apparatus may be configured to: detect, while flying between poses in the sequence of poses of the scan plan, an obstacle, wherein the detection is performed based on images captured using the one or more image sensors; and dynamically adjust a pose of the sequence of poses of the scan plan to avoid the obstacle.

A facet is a polygon oriented in three-dimensional space to approximate a surface of the roof. The real surface does not necessarily conform to this planar model. A deviation is a distance of a point of the real surface from the facet corresponding to the real surface. For example, deviations may occur due to aggregation inherent in the facet estimation process that fails to model smaller features, such as vent caps or small skylights on a roof. Deviations can also be caused by errors in the three-dimensional scan process. Deviations are detected by analyzing images (e.g., two or more images providing stereoscopic vision) captured from closeup during execution of the scan plan. Adjustments are made to maintain the consistent distance from the actual surface, taking into account the higher resolution data regarding deviations that become available as you approach the nominal pose for an image capture of the scan plan. For example, the processing apparatus may be configured to: detect, while flying between poses in the sequence of poses of the scan plan, a deviation of points on a surface of the roof from one of the one or more facets, wherein the detection is performed based on images captured using the one or more image sensors; and dynamically adjust a pose of the sequence of poses of the scan plan to adapt to the deviation and maintain the consistent distance for image capture.

The unmanned aerial vehicle 110 may output image data and/or other sensor data captured during execution of the scan plan to the controller 120 for viewing by a user, storage, and/or further offline analysis. For example, the processing apparatus may be configured to: determine area estimates for each of the one or more facets; and present a data structure including the one or more facets, the area estimates of each of the one or more facets, and images of the roof captured during execution of the scan plan. For example, area estimates may be converted to or accompanied by corresponding cost estimates for maintenance operations on a portion of the roof corresponding the facet. The output from the unmanned aerial vehicle 110 may also include an indication of the coverage of the roof that was achieved by execution of the scan plan. For example, the processing apparatus may be configured to: generate a coverage map of the one or more facets indicating which of the one or more facets have been successfully imaged during execution of the scan plan; and present the coverage map (e.g. via transmission of data encoding the coverage map to the controller 120).

Some roofs may be too large to complete execution of the scan plan on a single charge of the battery of the unmanned aerial vehicle 110. It may be useful to pause execution of a scan plan while the unmanned aerial vehicle 110 lands and recharges, before continuing execution of the scan plan where it paused. For example, the docking station 130 may facilitate safe landing and charging of the unmanned aerial vehicle 110 while the execution of the scan plan is paused. In some implementations, the processing apparatus is configured to: after starting and before completing the scan plan, store a scan plan state indicating a next pose of the sequence of poses of the scan plan; after storing the scan plan state, control the propulsion mechanism to cause the unmanned aerial vehicle to fly to land; after landing, control the propulsion mechanism to cause the unmanned aerial vehicle to fly to take off; access the scan plan state; and based on the scan plan state, control the propulsion mechanism to cause the unmanned aerial vehicle to fly to assume the next pose and continue execution of the scan plan. For example, the scan plan state may include a copy of the scan plan and an indication of the next pose, such as a pointer to the next pose in the sequence of poses of the scan plan. In some implementations, the docking station is configured to enable automated landing charging and take-off of the unmanned aerial vehicle 110. For example, the docking station 130 may be the dock 300 of FIG. 3.

Figure 2A:
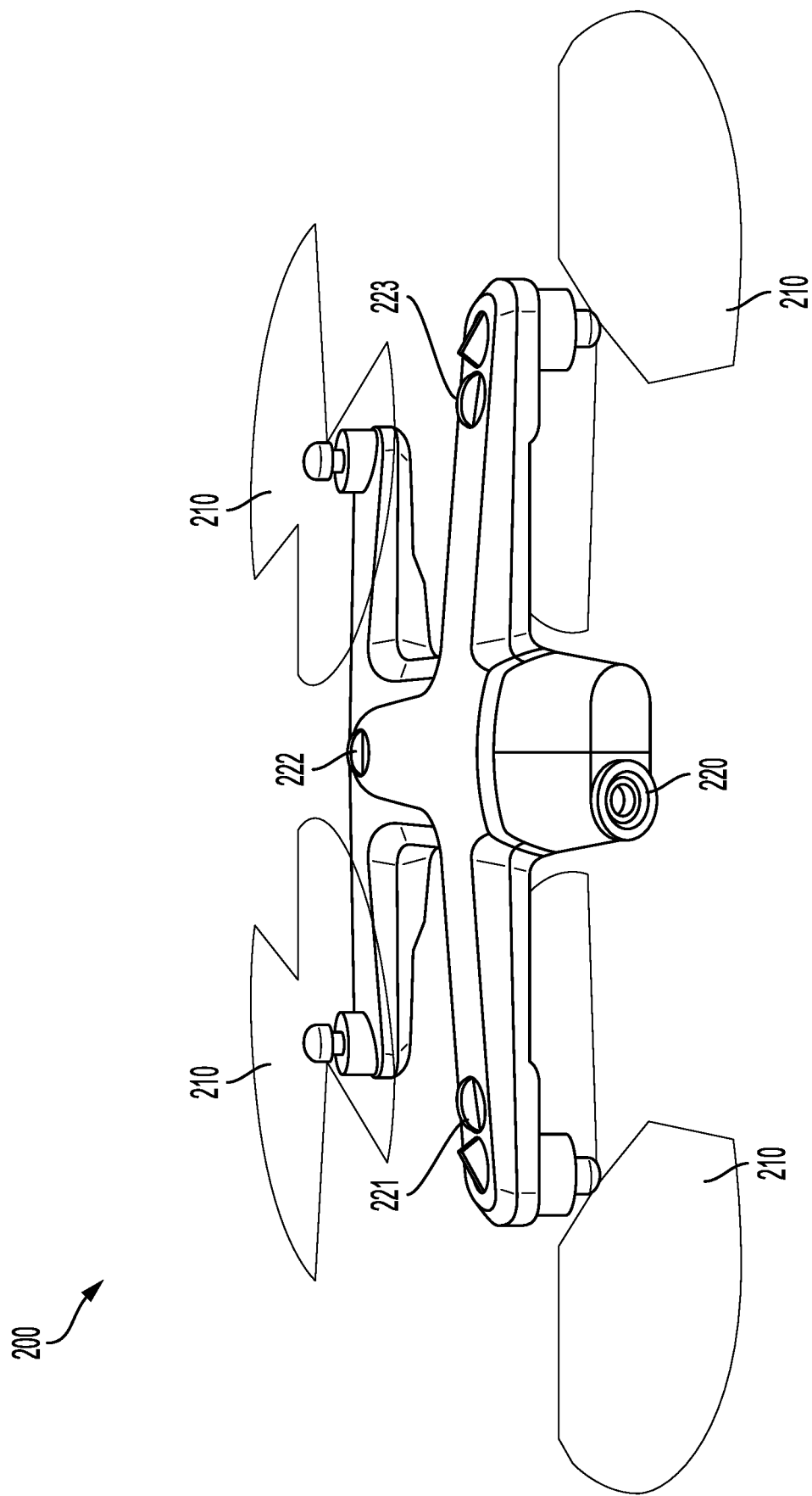
FIG. 2A is an illustration of an example of an unmanned aerial vehicle configured for roof scanning as seen from above.

FIG. 2A is an illustration of an example of an unmanned aerial vehicle 200 configured for roof scanning as seen from above. The unmanned aerial vehicle 200 includes a propulsion mechanism 210 including four propellers and motors configured to spin the propellers. For example, the unmanned aerial vehicle 200 may be a quad-copter drone. The unmanned aerial vehicle 200 includes image sensors, including a high-resolution image sensor 220 that mounted on a gimbal to support steady, low-blur image capture and object tracking. For example, the image sensor 220 may be used for high resolution scanning of surfaces of a roof during execution of a scan plan. The unmanned aerial vehicle 200 also includes lower resolution image sensors 221, 222, and 223 that are spaced out around the top of the unmanned aerial vehicle 200 and covered by respective fisheye lenses to provide a wide field of view and support stereoscopic computer vision. The unmanned aerial vehicle 200 also includes an internal processing apparatus (not shown in FIG. 2A). For example, the unmanned aerial vehicle 200 may include the hardware configuration 400 of FIG. 4. In some implementations, the processing apparatus is configured to automatically fold the propellers when entering a docking station (e.g., the dock 300 of FIG. 3), which may allow the dock to have a smaller footprint than the area swept out by the propellers of the propulsion mechanism 210.

Figure 2B:
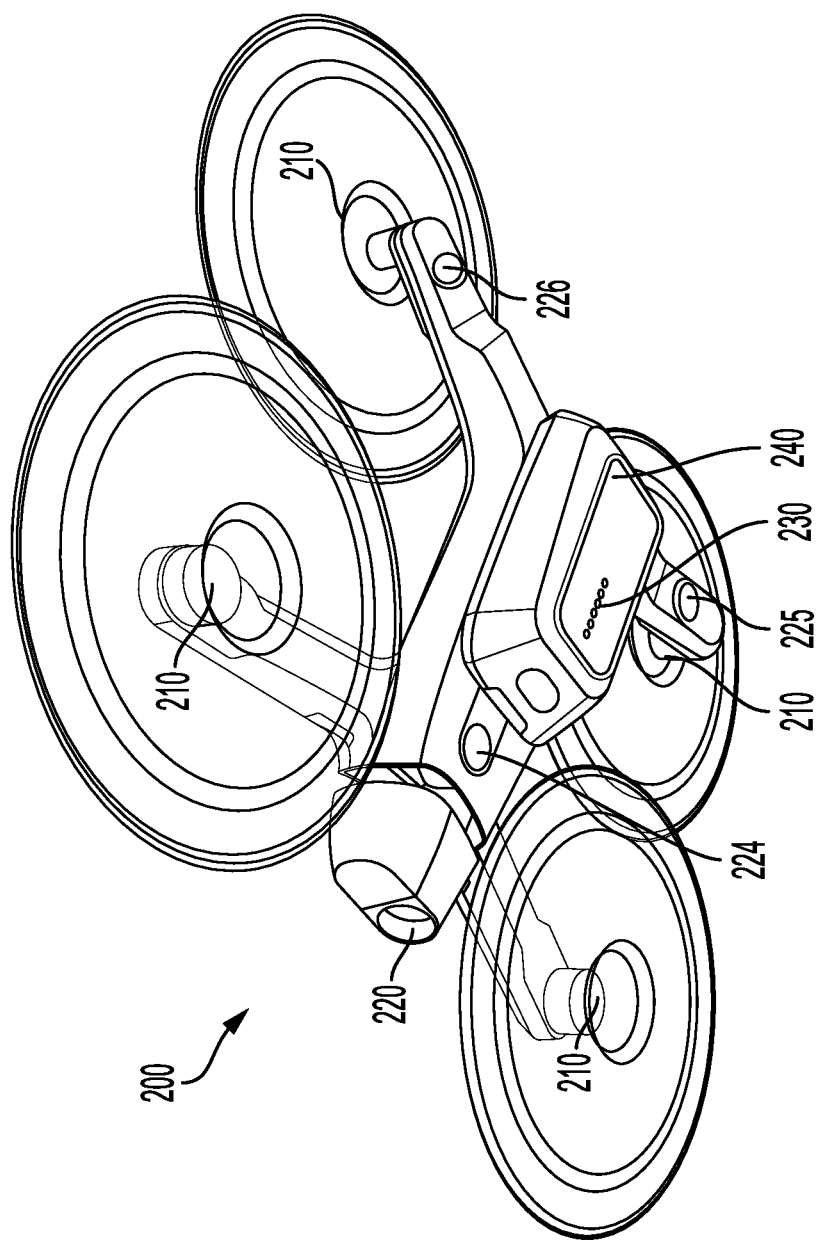
FIG. 2B is an illustration of an example of an unmanned aerial vehicle configured for roof scanning as seen from below.

FIG. 2B is an illustration of an example of an unmanned aerial vehicle 200 configured for roof scanning as seen from below. From this perspective three more image sensors arranged on the bottom of the unmanned aerial vehicle 200 may be seen: the image sensor 224, the image sensor 225, and the image sensor 226. These image sensors (224-226) may also be covered by respective fisheye lenses to provide a wide field of view and support stereoscopic computer vision. This array of image sensors (220-226) may enable visual inertial odometry (VIO) for high resolution localization and obstacle detection and avoidance. For example, the array of image sensors (220-226) may be used to scan a roof to obtain range data and generate a three-dimensional map of the roof.

The unmanned aerial vehicle 200 may be configured for autonomous landing on a landing surface 310. The unmanned aerial vehicle 200 also includes a battery in battery pack 240 attached on the bottom of the unmanned aerial vehicle 200, with conducting contacts 230 to enable battery charging. For example, the techniques described in relation to FIG. 3 may be used to land an unmanned aerial vehicle 200 on the landing surface 310 of the dock 300.

The bottom surface of the battery pack 240 is a bottom surface of the unmanned aerial vehicle 200. The battery pack 240 is shaped to fit on the landing surface 310 at the bottom of the funnel shape. As the unmanned aerial vehicle 200 makes its final approach to the landing surface 310, the bottom of the battery pack 240 will contact the landing surface 310 and be mechanically guided by the tapered sides of the funnel to a centered location at the bottom of the funnel. When the landing is complete, the conducting contacts of the battery pack 240 may come into contact with the conducting contacts 330 on the landing surface 310, making electrical connections to enable charging of the battery of the unmanned aerial vehicle 200. The dock 300 may include a charger configured to charge the battery while the unmanned aerial vehicle 200 is on the landing surface 310.

Figure 2C:
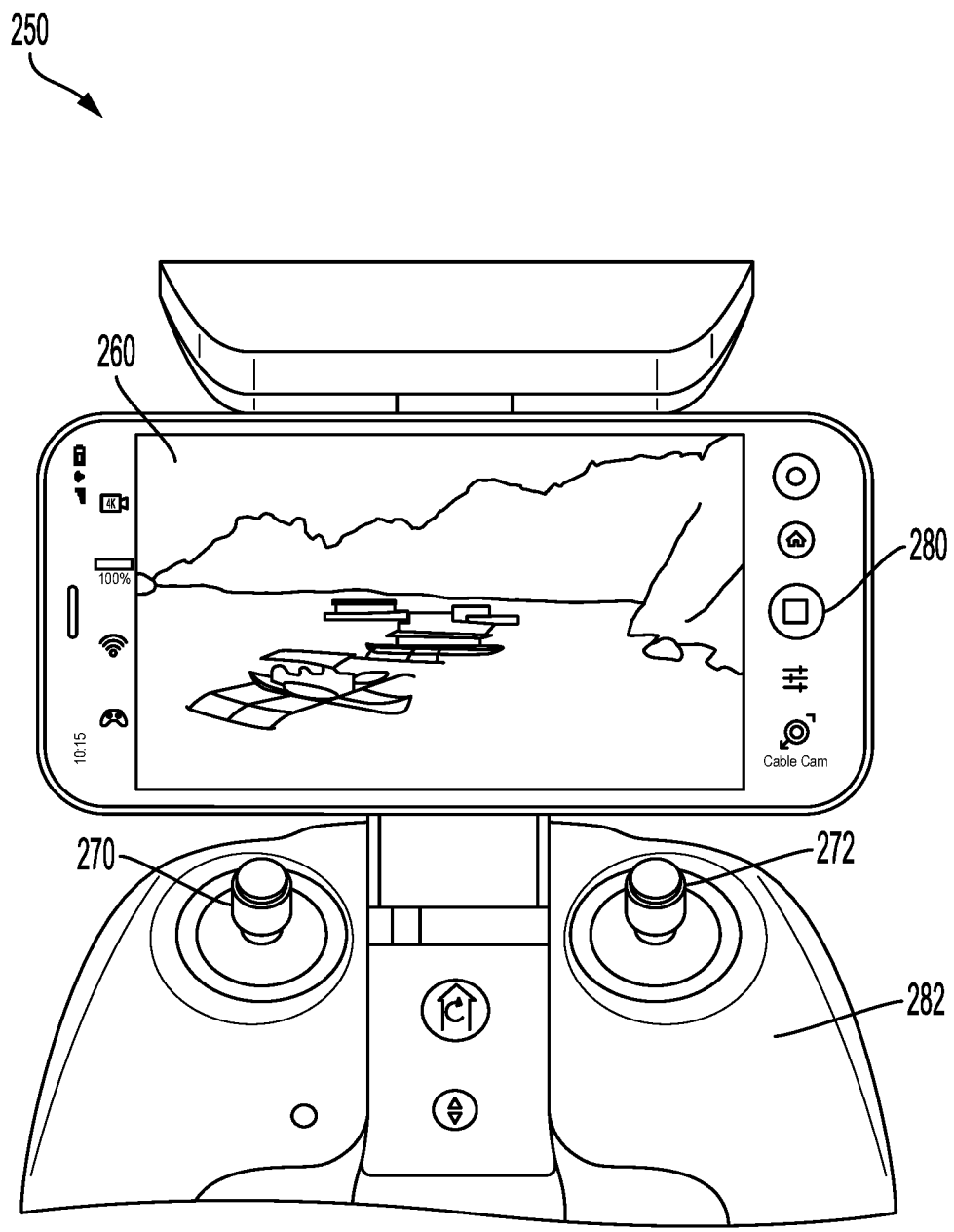
FIG. 2C is an illustration of an example of a controller for an unmanned aerial vehicle.

FIG. 2C is an illustration of an example of a controller 250 for an unmanned aerial vehicle. The controller 250 may provide a user interface for controlling the unmanned aerial vehicle and reviewing data (e.g., images) received from the unmanned aerial vehicle. The controller 250 includes a touchscreen 260; a left joystick 270; and a right joystick 272. In this example, the touchscreen 260 is part of a smartphone 280 that connects to controller attachment 282, which, in addition to providing addition control surfaces including the left joystick 270 and the right joystick 272, may provide range extending communication capabilities for longer distance communication with the unmanned aerial vehicle.

In some implementations, processing (e.g., image processing and control functions) may be performed by an application running on a processor of a remote controller device (e.g., the controller 250 or a smartphone) for an unmanned aerial vehicle being controlled using the remote controller device. Such a remote controller device may provide the interactive features, where the app provides all the functionalities using the video content provided by the unmanned aerial vehicle. For example, steps various steps of the processes 600, 700, 800, 900, 1000, 1100, and 1200 of FIGS. 6-12 may be implemented using a processor of a remote controller device (e.g., the controller 250 or a smartphone) that is in communication with an unmanned aerial vehicle to control the unmanned aerial vehicle.

Much of the value and challenges of autonomous unmanned aerial vehicles lies in enabling robust, fully autonomous missions. Disclosed herein is a dock platform that enables unmanned charging, takeoff, landing, and mission planning of an unmanned aerial vehicle (UAV). Some implementations enable the reliable operation of such a platform and the relevant application programming interface designs that make the system accessible by a wide variety of consumer and commercial applications.

One of the largest limiting factors for operating a drone is the battery. A typical drone can operate for 20-30 minutes before needing a fresh battery pack. This sets a limit on how long an autonomous drone can operate without human intervention. Once a battery pack is drained, an operator has to land the drone and swap the pack for a fully charged one. While battery technology keeps improving and achieving higher energy densities, the improvements are incremental and may not paint a clear roadmap for sustained autonomous operation. An approach to alleviating the need for regular human intervention is to automate the battery management operation with some sort of automated base station.

Some methods disclosed herein leverage visual tracking and control software to be able to perform pin-point landings onto a much smaller target. By using visual fiducials to aid absolute position tracking relative to the base station, the UAV (e.g., a drone) may be able to reliably hit a 5 cm×5 cm target in a variety of environmental conditions. This means that the UAV can be very accurately positioned with the help of a small, passive funnel geometry that helps guide the UAV's battery, which extends below the rest of the UAV's structure, onto a set of charging contacts without the need for any complex actuation or large structure. This may enable a basic implementation of a base station to simply consist of a funnel shaped nest with a set of spring contacts and a visual tag within. To reduce the turbulent ground effect that a UAV typically encounters during landing, this nest can be elevated above the ground, and the profile of the nest itself can be made small enough to stay centered between the UAV's prop wash during landing. Prop wash, or propeller wash, is the disturbed mass of air pushed by a propeller of an aircraft. To allow reliable operation in GPS denied environments, a fiducial (e.g., a small visual tag) within the nest can be supplemented with a larger fiducial (e.g., a large visual tag) located somewhere outside the landing nest, such as on a flexible mat that can be rolled out on the ground near the base station, or attached to a wall nearby. The supplemental visual tag can be easily spotted by the UAV from a significant distance away in order to allow the UAV to reacquire its absolute position relative to the landing nest in a GPS denied environments regardless of any visual inertial odometry (VIO) navigational drift that may have built up over the course of the UAV's mission. Finally, in order for a UAV to be able to cover a large area, a reliable communications link with the UAV may be maintained. Since in most cases an ideal land-and-recharge location is not a good place to locate a transmitter, the communication circuitry may be placed in a separate range-extender module that can be ideally placed somewhere up high and central to the desired mission space for maximum coverage.

The simplicity and low cost of such a system makes up for the amount of time that the UAV is unavailable while its battery is recharged, when compared to a more complex and expensive battery swapping system. Intermittent operation is sufficient for a lot of use cases, and users that need more UAV coverage can simply increase UAV availability by adding another UAV and base station system. This approach of cheaper but more may be cost competitive with a large and expensive battery swapping system, and may also greatly increase system reliability by eliminating the ability of a single point of failure to take down the whole system.

For use cases where a UAV (e.g., a drone) needs to be sheltered from the elements but an existing structure with UAV access is not available, the UAV nest can be incorporated into a small custom shed. This shed may consist of roofed section that the UAV would land beneath attached to a roofless vestibule area that would act as a wind shelter and let the UAV enter and perform a precision landing even in high winds. One useful feature of such a shelter would be an open or vented section along the entire perimeter at the bottom of the walls that would let the drone's downdraft leave the structure instead of turbulently circulating within and negatively impacting stable flight.

For use cases where a UAV (e.g., a drone) needs to be secured more robustly from dust, cold, theft, etc., a mechanized "drone in a box" enclosure may be used. For example, a drawer like box that is just slightly larger than the UAV itself may be used as a dock for the UAV. In some implementations, a motorized door on the side of the box can open 180 degrees to stay out of the downdraft of the UAV. For example, within the box, the charging nest may be mounted onto a telescoping linear slide that holds the UAV well clear of the box when the UAV is taking off or landing. In some implementations, once the UAV lands, the slide would pull the UAV back into the box while the UAV slowly spins the props backwards to fold them into the small space and move them out of the way of the door. This allows the box's footprint to be smaller than the area that the UAV sweeps out with its propellers. In some implementations, a two bar linkage connecting the door to its motor is designed to rotate past center in such a way that once closed, one cannot back-drive the motor by pulling on the door from the outside, effectively locking the door. For example, the UAV may be physically secured within the nest by a linkage mechanism that would leverage the final centimeters of the slide's motion to press the UAV firmly into the nest with a soft roller. Once secured, the box can be safely transported or even inverted without dislodging the UAV.

This actuated enclosure design may be shelf mounted or free standing on an elevated base that would ensure that the UAV is high enough above the ground to avoid ground effect during landing. The square profile of the box makes it simple to stack multiple boxes on top of each other for a multi-drone hive configuration, where each box is rotated 90° to the box below it so that multiple drones can take off and land at the same time without interfering with each other. Because the UAV is physically secured within the enclosure when the box is closed, the box can be mounted to a car or truck and avoid experiencing charging disruptions while the vehicle is moving. For example, in implementations where the UAV deploys sideways out of the box, the box can be flush mounted into a wall to ensure that is entirely out of the way when not landing or taking off.

When closed, the box can be made to have a very high ingress protection (IP) rating, and can be equipped with a rudimentary cooling and heating system to make the system function in many outdoor environments. For example, a high-efficiency particulate absorbing (HEPA) filter over an intake cooling fan may be used to protect the inside of the enclosure from dust in the environment. A heater built into the top of the box can melt away snow accumulation in wintery locations.

For example, the top and sides of the box can be made out of material that do not block radio frequencies, so that a version of the communications range extender can be incorporated within the box itself for mobile applications. In this manner, a UAV (e.g., a drone) can maintain GPS lock while charging and be able to deploy at a moment's notice. In some implementations, a window may be incorporated into the door, or the door and the side panels of the box can be made transparent so that the UAV can see its surroundings before it deploys, and so that the UAV can act as its own security camera to deter theft or vandalism.

In some implementations, spring loaded micro-fiber wipers can be located inside the box in such a way that the navigational camera lenses are wiped clean whenever the drone slides into or out of the box. In some implementations, a small diaphragm pump inside the box can charge up a small pressure vessel that can then be used to clean all of the drone's lenses by blowing air at them through small nozzles within the box.

For example, the box can be mounted onto a car by way of three linear actuators concealed within a mounting base that would be able to lift and tilt the box at the time of launch or landing to compensate for the vehicle standing on a hilly street or uneven terrain.

In some implementations, the box can include a single or double door on the top of the box that once it slides or swings open allows the landing nest to extend up into the open air instead of out to the side. This would also take advantage of the UAV ability to land on a small target while away from any obstacles or surfaces that interfere with the UAV's propeller wash (which makes stable landing harder), and then once the UAV lands, the UAV and the nest may be retracted into a secure enclosure.

Software running on a processing apparatus in an unmanned aerial vehicle and/or on a processing apparatus in a dock for the UAV may be used to implement the autonomous landing techniques described herein.

For example, a robust estimation and re-localization procedure may include visual relocalization of a dock with a landing surface at multiple scales. For example, the UAV software may support a GPS→visual localization transition. In some implementations, arbitrary fiducial (e.g., visual tag) designs, sizes, and orientations around dock may be supported. For example, software may enable detection and rejection of spurious detections.

For example, a takeoff and landing procedure for UAV may include robust planning & control in wind using model-based wind estimation and/or model-based wind compensation. For example, a takeoff and landing procedure for UAV may include a landing "honing procedure," which may stop shortly above the landing surface of a dock. Since State estimation and visual detection is more accurate than control in windy environments, wait until the position, velocity, and angular error between the actual vehicle and fiducial on the landing surface is low before committing to land. For example, a takeoff and landing procedure for UAV may include a dock-specific landing detection and abort procedure. For example, actual contact with dock may be detected and the system may differentiate between a successful landing and a near-miss. For example, a takeoff and landing procedure for UAV may include employing a slow, reverse motor spin to enable self-retracting propellers.

In some implementations, a takeoff and landing procedure for UAV may include support for failure cases and fallback behavior, such as, setting a predetermined land position in the case of failure; going to another box; an option to land on top of dock if box is jammed, etc.

For example, an application programming interface design may be provided for single-drone, single-dock operation. For example, skills may be performed based on a schedule, or as much as possible given battery life or recharge rate.

For example, an application programming interface design for N drones with M docks operation may be provided. In some implementations, mission parameters may be defined, such that, UAVs (e.g., drones) are automatically dispatched and recalled to constantly satisfy mission parameters with overlap.

An unmanned aerial vehicle (UAV) may be configured to automatically fold propellers to fit in the dock. For example, the dock may be smaller than the full UAV. Persistent operation can be achieved with multiple UAVs docking, charging, performing missions, waiting in standby to dock, and/or charging in coordination. In some implementations, a UAV is automatically serviced while it is in position within the dock. For example, automated servicing of a UAV may include: charging a battery, cleaning sensors, cleaning and/or drying the UAV more generally, changing a propeller, and/or changing a battery.

A UAV may track its state (e.g., a pose including a position and an orientation) using a combination of sensing modalities (e.g., visual inertial odometry (VIO) and global positioning system (GPS) based operation) to provide robustness against drift.

In some implementations, during takeoff and landing, as a UAV approaches the dock it constantly hones in on the landing spot. The honing process may make a takeoff and landing procedure robust against wind, ground effect, & other disturbances. For example, intelligent honing may use position, heading, and trajectory to get within a very tight tolerance. In some implementations, rear motors may reverse to get in.

Some implementations may provide advantages over earlier systems, such as; a small, inexpensive, and simple dock; retraction mechanism may allow for stacking and mitigate aerodynamic turbulence issues around landing; robust visual landing that may be more accurate; automated retraction of propeller to enable tight packing during charging, maintenance, and storage of UAV; vehicle may be serviced while docked without human intervention; persistent autonomous operation of multiple vehicles via dock, SDK, vehicles, & services (hardware & software).

Figure 3:
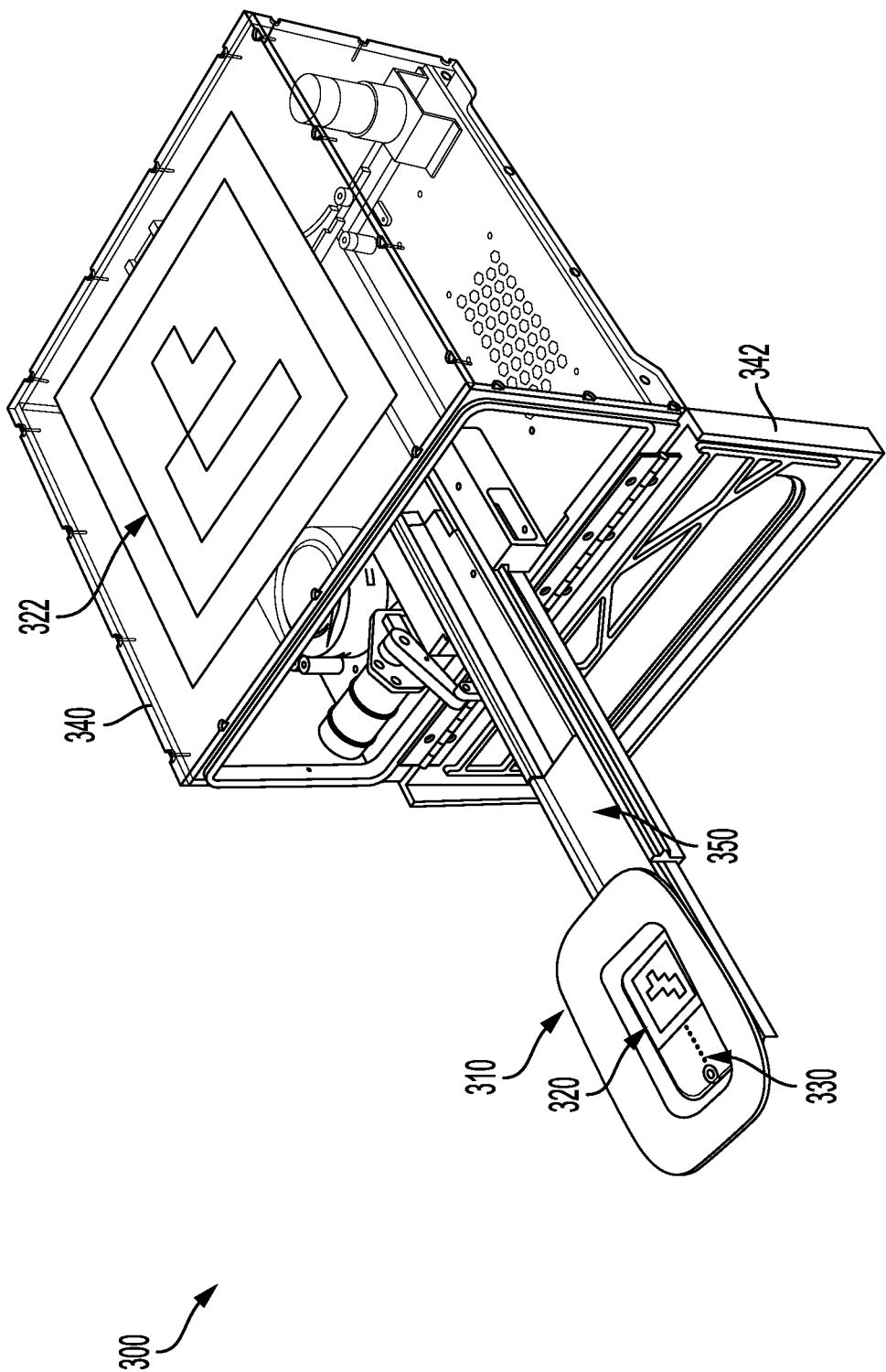
FIG. 3 is an illustration of an example of a dock for facilitating autonomous landing of an unmanned aerial vehicle.

FIG. 3 is an illustration of an example of a dock 300 for facilitating autonomous landing of an unmanned aerial vehicle. The dock 300 includes a landing surface 310 with a fiducial 320 and charging contacts 330 for a battery charger. The dock 300 includes a box 340 in the shape of a rectangular box with a door 342. The dock 300 includes a retractable arm 350 that supports the landing surface 310 and enables the landing surface 310 to be positioned outside the box 340, to facilitate takeoff and landing of an unmanned aerial vehicle, or inside the box 340, for storage and/or servicing of an unmanned aerial vehicle. The dock 300 includes a second, auxiliary fiducial 322 on the outer top surface of the box 340. The root fiducial 320 and the auxiliary fiducial 322 may be detected and used for visual localization of the unmanned aerial vehicle in relation the dock 300 to enable a precise landing on a small landing surface 310. For example, the techniques described in U.S. Patent Application No. 62/915,639, which is incorporated by reference herein, may be used to land an unmanned aerial vehicle on the landing surface 310 of the dock 300.

The dock 300 includes a landing surface 310 configured to hold an unmanned aerial vehicle (e.g., the unmanned aerial vehicle 200 of FIG. 2) and a fiducial 320 on the landing surface 310. The landing surface 310 has a funnel geometry shaped to fit a bottom surface of the unmanned aerial vehicle at a base of the funnel. The tapered sides of the funnel may help to mechanically guide the bottom surface of the unmanned aerial vehicle into a centered position over the base of the funnel during a landing. For example, corners at the base of the funnel may server to prevent the aerial vehicle from rotating on the landing surface 310 after the bottom surface of the aerial vehicle has settled into the base of the funnel shape of the landing surface 310. For example, the fiducial 320 may include an asymmetric pattern that enables robust detection and determination of a pose (i.e., a position and an orientation) of the fiducial 320 relative to the unmanned aerial vehicle based on an image of the fiducial 320 captured with an image sensor of the unmanned aerial vehicle. For example, the fiducial 320 may include a visual tag from the AprilTag family.

The dock 300 includes conducting contacts 330 of a battery charger on the landing surface 310, positioned at the bottom of the funnel. The dock 300 includes a charger configured to charge the battery while the unmanned aerial vehicle is on the landing surface 310.

The dock 300 includes a box 340 configured to enclose the landing surface 310 in a first arrangement (shown in FIG. 4) and expose the landing surface 310 in a second arrangement (shown in FIGS. 3 and 3). The dock 300 may be configured to transition from the first arrangement to the second arrangement automatically by performing steps including opening a door 342 of the box 340 and extending the retractable arm 350 to move the landing surface 310 from inside the box 340 to outside of the box 340. The auxiliary fiducial 322 is located on an outer surface of the box 340.

The dock 300 includes a retractable arm 350 and the landing surface 310 is positioned at an end of the retractable arm 350. When the retractable arm 350 is extended, the landing surface 310 is positioned away from the box 340 of the dock 300, which may reduce or prevent propeller wash from the propellers of an unmanned aerial vehicle during a landing, thus simplifying the landing operation. The retractable arm 350 may include aerodynamic cowling for redirecting propeller wash to further mitigate the problems of propeller wash during landing.

For example, the fiducial 320 may be a root fiducial, and the auxiliary fiducial 322 is larger than the root fiducial 320 to facilitate visual localization from farther distances as an unmanned aerial vehicle approaches the dock 300. For example, the area of the auxiliary fiducial 322 may be 25 times the area of the root fiducial 320. For example, the auxiliary fiducial 322 may include an asymmetric pattern that enables robust detection and determination of a pose (i.e., a position and an orientation) of the auxiliary fiducial 322 relative to the unmanned aerial vehicle based on an image of the auxiliary fiducial 322 captured with an image sensor of the unmanned aerial vehicle. For example, the auxiliary fiducial 322 may include a visual tag from the AprilTag family. For example, a processing apparatus (e.g., the processing apparatus 410) of the unmanned aerial vehicle may be configured to detect the auxiliary fiducial 322 in at least one of one or more images captured using an image sensor of the unmanned aerial vehicle; determine a pose of the auxiliary fiducial 322 based on the one or more images; and control, based on the pose of the auxiliary fiducial, the propulsion mechanism to cause the unmanned aerial vehicle to fly to a first location in a vicinity of the landing surface 310. Thus, the auxiliary fiducial 322 may facilitate the unmanned aerial vehicle getting close enough to the landing surface 310 to enable detection of the root fiducial 320.

The dock 300 may enable automated landing and recharging of an unmanned aerial vehicle, which may in turn enable automated scanning of a large roof that requires more than one battery pack charge to scan to be automatically scanned without user intervention. For example, an unmanned aerial vehicle may be configured to: after starting and before completing the scan plan, storing a scan plan state indicating a next pose of the sequence of poses of the scan plan; after storing the scan plan state, controlling the propulsion mechanism to cause the unmanned aerial vehicle to fly to land; after landing, controlling the propulsion mechanism to cause the unmanned aerial vehicle to fly to take off; accessing the scan plan state; and, based on the scan plan state, controlling the propulsion mechanism to cause the unmanned aerial vehicle to fly to assume the next pose and continue execution of the scan plan. In some implementations, controlling the propulsion mechanism to cause the unmanned aerial vehicle to fly to land includes: controlling a propulsion mechanism of an unmanned aerial vehicle to cause the unmanned aerial vehicle to fly to a first location in a vicinity of a dock (e.g., the dock 300) that includes a landing surface (e.g., the landing surface 310) configured to hold the unmanned aerial vehicle and a fiducial on the landing surface; accessing one or more images captured using an image sensor of the unmanned aerial vehicle; detecting the fiducial in at least one of the one or more images; determining a pose of the fiducial based on the one or more images; and controlling, based on the pose of the fiducial, the propulsion mechanism to cause the unmanned aerial vehicle to land on the landing surface. For example, this technique of automated landings may include automatically charge a battery of the unmanned aerial vehicle using a charger included in the dock while the unmanned aerial vehicle is on the landing surface.

Figure 4:
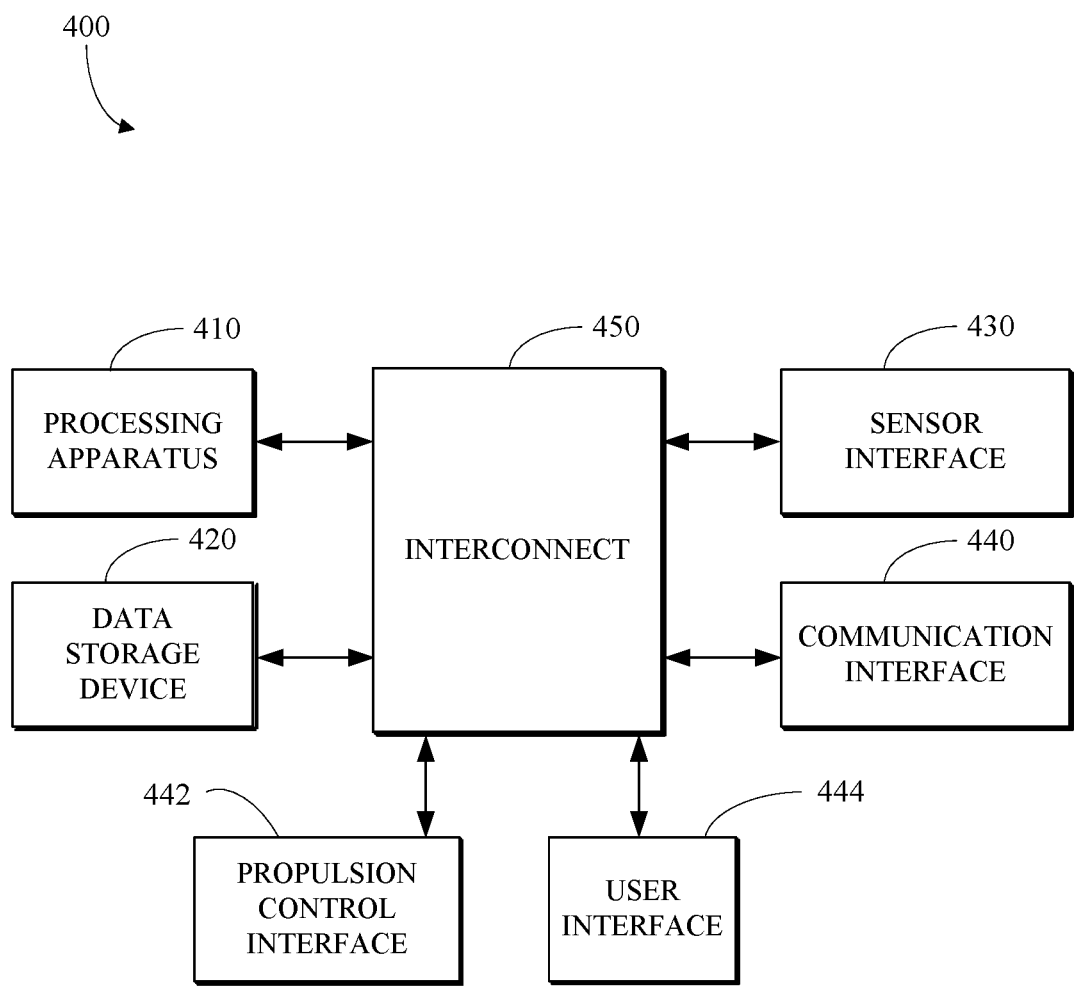
FIG. 4 is a block diagram of an example of a hardware configuration of an unmanned aerial vehicle.

FIG. 4 is a block diagram of an example of a hardware configuration 400 of an unmanned aerial vehicle. The hardware configuration may include a processing apparatus 410, a data storage device 420, a sensor interface 430, a communications interface 440, propulsion control interface 442, a user interface 444, and an interconnect 450 through which the processing apparatus 410 may access the other components. For example, the hardware configuration 400 may be or be part of an unmanned aerial vehicle (e.g., the unmanned aerial vehicle 200). For example, the unmanned aerial vehicle may be configured to scan a roof. For example, the unmanned aerial vehicle may be configured to implement the process 600 of FIG. 6. In some implementations, the unmanned aerial vehicle may be configured to detect one or more fiducials on a dock (e.g., the dock 300) use estimates of the pose of the one or more fiducials to land on a small landing surface to facilitate automated maintenance of the unmanned aerial vehicle.

The processing apparatus 410 is operable to execute instructions that have been stored in a data storage device 420. In some implementations, the processing apparatus 410 is a processor with random access memory for temporarily storing instructions read from the data storage device 420 while the instructions are being executed. The processing apparatus 410 may include single or multiple processors each having single or multiple processing cores. Alternatively, the processing apparatus 410 may include another type of device, or multiple devices, capable of manipulating or processing data. For example, the data storage device 420 may be a non-volatile information storage device such as, a solid-state drive, a read-only memory device (ROM), an optical disc, a magnetic disc, or any other suitable type of storage device such as a non-transitory computer readable memory. The data storage device 420 may include another type of device, or multiple devices, capable of storing data for retrieval or processing by the processing apparatus 410. The processing apparatus 410 may access and manipulate data stored in the data storage device 420 via interconnect 450. For example, the data storage device 420 may store instructions executable by the processing apparatus 410 that upon execution by the processing apparatus 410 cause the processing apparatus 410 to perform operations (e.g., operations that implement the process 600 of FIG. 6, the process 700 of FIG. 7, the process 800 of FIG. 8, the process 900 of FIG. 9, and/or the process 1000 of FIG. 10).

The sensor interface 430 may be configured to control and/or receive data (e.g., temperature measurements, pressure measurements, a global positioning system (GPS) data, acceleration measurements, angular rate measurements, magnetic flux measurements, and/or a visible spectrum image) from one or more sensors (e.g., including the image sensor 220). In some implementations, the sensor interface 430 may implement a serial port protocol (e.g., I2C or SPI) for communications with one or more sensor devices over conductors. In some implementations, the sensor interface 430 may include a wireless interface for communicating with one or more sensor groups via low-power, short-range communications (e.g., a vehicle area network protocol).

The communications interface 440 facilitates communication with other devices, for example, a paired dock (e.g., the dock 300), a specialized controller, or a user computing device (e.g., a smartphone or tablet). For example, the communications interface 440 may include a wireless interface, which may facilitate communication via a Wi-Fi network, a Bluetooth link, or a ZigBee link. For example, the communications interface 440 may include a wired interface, which may facilitate communication via a serial port (e.g., RS-232 or USB). The communications interface 440 facilitates communication via a network.

The propulsion control interface 442 may be used by the processing apparatus to control a propulsion system (e.g., including one or more propellers driven by electric motors). For example, the propulsion control interface 442 may include circuitry for converting digital control signals from the processing apparatus 410 to analog control signals for actuators (e.g., electric motors driving respective propellers). In some implementations, the propulsion control interface 442 may implement a serial port protocol (e.g., I2C or SPI) for communications with the processing apparatus 410.

In some implementations, the propulsion control interface 442 may include a wireless interface for communicating with one or more motors via low-power, short-range communications (e.g., a vehicle area network protocol).

The user interface 444 allows input and output of information from/to a user. In some implementations, the user interface 444 can include a display, which can be a liquid crystal display (LCD), a light emitting diode (LED) display (e.g., an OLED display), or other suitable display. For example, the user interface 444 may include a touchscreen. For example, the user interface 444 may include buttons. For example, the user interface 444 may include a positional input device, such as a touchpad, touchscreen, or the like; or other suitable human or machine interface devices.

For example, the interconnect 450 may be a system bus, or a wired or wireless network (e.g., a vehicle area network). In some implementations (not shown in FIG. 4), some components of the unmanned aerial vehicle may be omitted, such as the user interface 444.

Figure 5A:
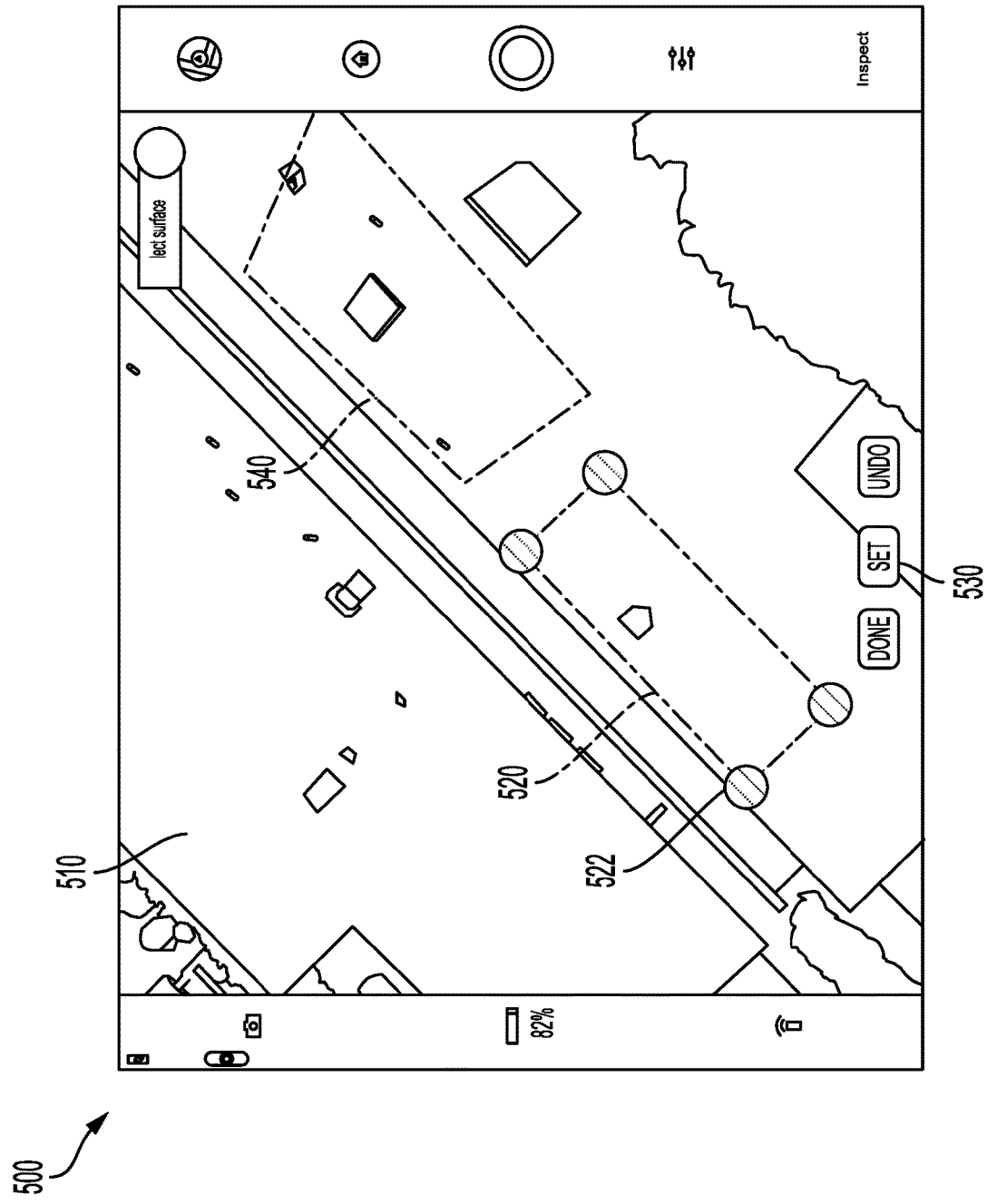
FIG. 5A is an illustration of an example of a graphical user interface of an unmanned aerial vehicle that is used to present a two-dimensional polygon projection of a facet overlaid on an overview image of a roof to enable editing of facets to facilitate roof scanning.

FIG. 5A is an illustration of an example of a graphical user interface 500 associated with an unmanned aerial vehicle, where the graphical user interface 500 is used to present a two-dimensional polygon projection of a facet overlaid on an overview image of a roof to enable editing of facets to facilitate roof scanning. The graphical user interface 500 includes an overview image 510 of a roof (e.g., a frozen image of a roof as shown in FIG. 5A). The graphical user interface 500 includes a graphical representation of a two-dimensional polygon 520, corresponding to a facet suggestion, which is a projection of a convex hull of the points of a three-dimensional map of the roof. This two-dimensional polygon 520 includes four vertices, including the vertex 522. A user can edit the two-dimensional polygon 520 by interacting (e.g., using a touchscreen display interface) with the vertex 522 to move the vertex 522 within the plane of the overview image 510. When the user is satisfied with the apparent coverage of the two-dimensional polygon 520, the user can interact with the confirmation icon 530 to cause data indicating the user edit of the two-dimensional polygon 520 to be returned to the unmanned aerial vehicle, which may then determine a facet based on the facet suggestion and the user edit. The graphical user interface 550 may then be updated to present the final facet by a final two-dimensional polygon overlaid on the overview image 510, similar to the final two-dimension polygon 540 shown for a nearby section of the roof without the interactive vertices. This process may continue with the user reviewing and/or editing facet suggestions until the roof is satisfactorily covered by facets. For example, the user interface may be displayed on a computing device remote from the unmanned aerial vehicle, such as the controller 120. For example, the unmanned aerial vehicle may be configured to present this graphical user interface 500 to a user by transmitting data encoding the graphical user interface 500 to a computing device (e.g., the controller 250 for display in the touchscreen 260).

Figure 5B:
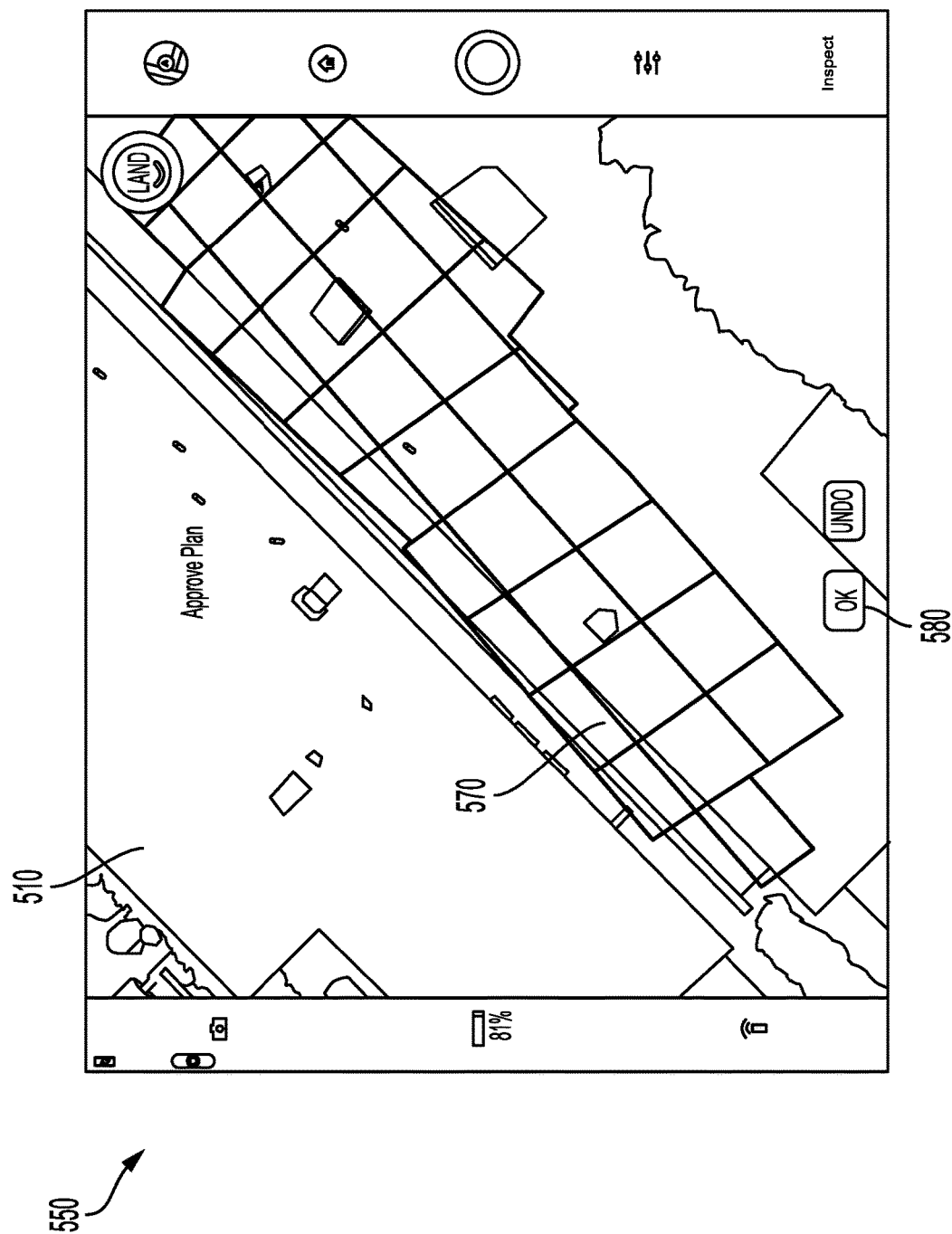
FIG. 5B is an illustration of an example of a graphical user interface of an unmanned aerial vehicle that is used to present a scan plan overlaid on an overview image of a roof to enable user review to facilitate roof scanning.

FIG. 5B is an illustration of an example of a graphical user interface 550 of an unmanned aerial vehicle that is used to present a scan plan overlaid on an overview image of a roof to enable user review to facilitate roof scanning. The graphical user interface 550 includes the overview image 510 of a roof (e.g., a frozen image of a roof as shown in FIG. 5B). The graphical user interface 550 includes a graphical representation of a field of view 570 of an image sensor from a given pose in a sequence of poses of a scan plan. The field of view 570 may have been projected into the plane of the overview image 510. A collection of fields of view corresponding to respective poses of a scan plan provide a graphical representation of the scan plan to facilitate user review and approval of the scan plan. In some implementations, the user can adjust parameters of the scan plan, such as vertical overlap, horizontal overlap, and distance from surface, to cause the scan plan and the resulting fields of view for the poses to be regenerated. When the user is satisfied with the scan plan, the user can approve the scan plan by interacting with the approval icon 580 to cause the unmanned aerial vehicle to commence execution of the scan plan.

Figure 6:
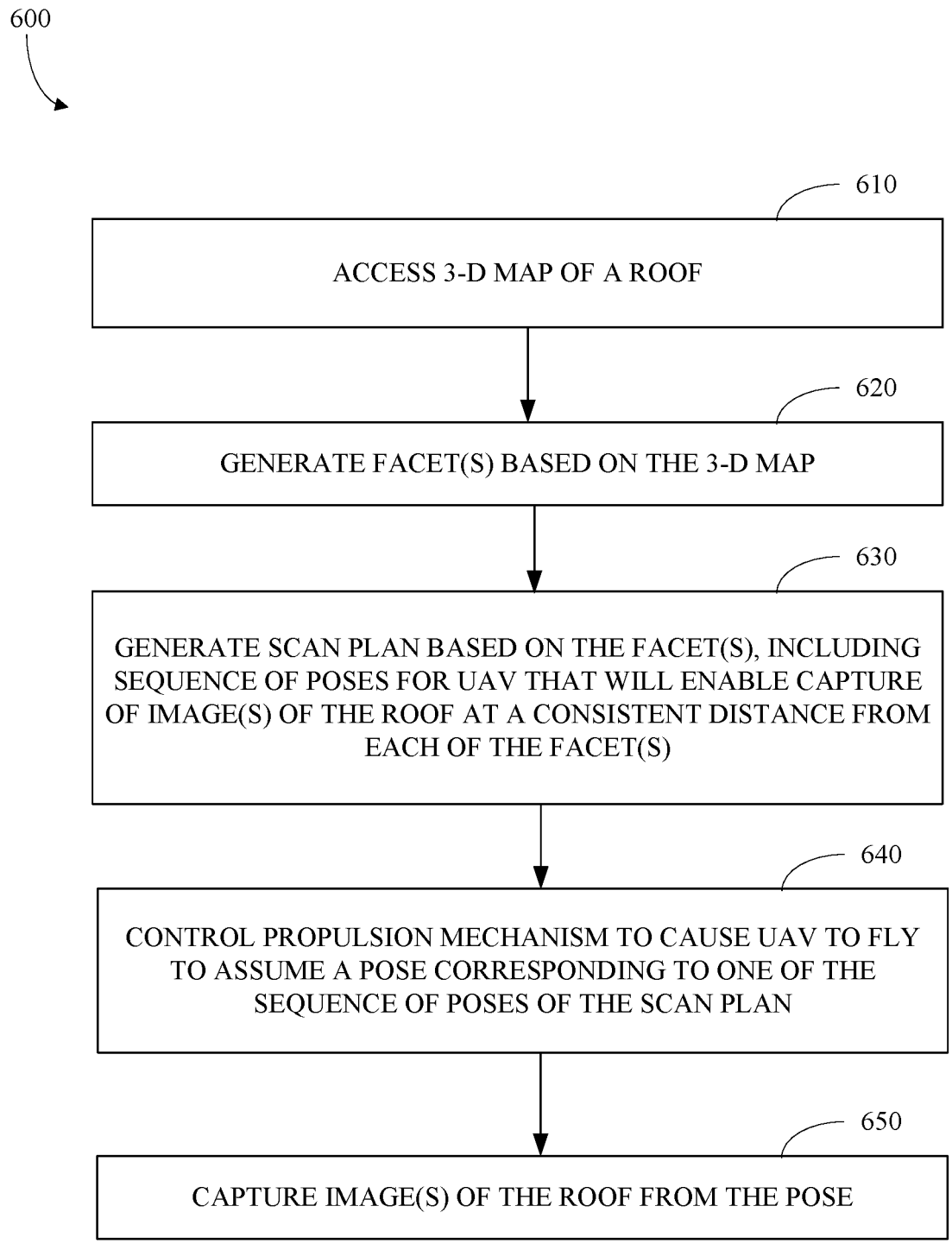
FIG. 6 is a flowchart of an example of a process for roof scan using an unmanned aerial vehicle.

FIG. 6 is a flowchart of an example of a process 600 for roof scan using an unmanned aerial vehicle. The process 600 includes accessing 610 a three-dimensional map of a roof, where the three-dimensional map encodes a set of points in three-dimensional space on surfaces of the roof; generating 620 one or more facets based on the three-dimensional map, where a given facet of the one or more facets is a polygon on a plane in three-dimensional space fit to a subset of the points in the three-dimensional map; generating 630 a scan plan based on the one or more facets, where the scan plan includes a sequence of poses for an unmanned aerial vehicle to assume to enable capture, using one or more image sensors of the unmanned aerial vehicle, of images of the roof at a consistent distance from each of the one or more facets; controlling 640 a propulsion mechanism of an unmanned aerial vehicle to cause the unmanned aerial vehicle to fly to assume a pose corresponding to one of the sequence of poses of the scan plan; and capturing 650, using the one or more image sensors, one or more images of the roof from the pose. For example, the process 600 may be implemented by the unmanned aerial vehicle 110 of FIG. 1. For example, the process 600 may be implemented by the unmanned aerial vehicle 200 of FIGS. 2A-B. For example, the process 600 may be implemented using the hardware configuration 400 of FIG. 4.

The process 600 includes accessing 610 a three-dimensional map of a roof. The three-dimensional map encodes a set of points in three-dimensional space on surfaces of the roof. In some embodiments, the three-dimensional map may include a voxel occupancy map or a signed distance map. For example, the three-dimensional map may have been generated based on sensor data collected with a distance sensor (e.g., an array of image sensors configured for stereoscopic computer vision, a radar sensor, and/or a lidar sensor). In some implementations, the unmanned aerial vehicle that is accessing 610 the three-dimensional map has recently generated the three-dimensional map itself by performing a relatively low-resolution scan, using a distance sensor, while operating at a safe distance from the roof. In some implementations, the roof is scanned to generate the three-dimensional map from a distance greater than the consistent distance used for facet imaging. For example, the process 1000 of FIG. 10 may have been implemented to generate the three-dimensional map. For example, the process 1100 of FIG. 11 may have been implemented to generate the three-dimensional map. The three-dimensional map may be accessed 610 in variety of ways. For example, the three-dimensional map may be accessed 610 by reading directly from a distance sensor via a sensor interface (e.g., the sensor interface 430) or from a memory (e.g., the data storage device 420) via an interconnect (e.g., the interconnect 450).

The process 600 includes generating 620 one or more facets based on the three-dimensional map. A given facet of the one or more facets is a polygon on a plane in three-dimensional space fit to a subset of the points in the three-dimensional map. For example, facets may be identified by searching for the largest expanses of coplanar points in the three-dimensional map with low ratios of outlier points, and then fitting planes to these subsets of points. In some implementations, isolated outlier points may be filtered out.

In some implementations, user input may be used to identify a portion of facet and/or to refine the boundaries of a facet. For example, an overview image (e.g., a frozen view-point) of the roof may be presented in a graphical user interface (e.g., the graphical user interface 500) to a user. The user may click the center of a facet as it appears in the overview image. One or more points in the overview image at the location of the click interaction are projected onto points of the three-dimensional map, or equivalently points from the top surface of the three-dimensional map are projected into the overview image and associated with the location of the click interaction. Once the mapping from the click interaction location to a small subset of points of the three-dimensional map is established, a plane may be fit (e.g., using Random Sample Consensus (RANSAC)) to this small subset of points. The entirety of the three-dimensional map surface may then be considered to select points that are coplanar with and adjacent to points of the small subset, iteratively refining this subset. When the iteration converges, the resulting subset of points of the three-dimensional map is the basis of the facet suggestion. A convex hull of these points as projected into the image may be computed to obtain a two-dimensional polygon in the image plane of the overview image. In some implementations, user clicks across the top of the roof are simulated and the suggested facet boundary is used as the final facet boundary to more quickly determine the facets. In some implementations, the locations of three-dimensional facets may be jointly optimized for cleaner boundaries between facets. In some implementations, image-based machine learning is used to detect facets in an image space (e.g., a plane of an overview image) instead of three-dimensional space.

The resulting two-dimensional polygon (or convex hull) may be simplified by removing edges and extending neighboring edges as long as the area or edge length of the resulting polygon is not excessively increased. More specifically, for an input polygon, each edge may be considered. If the edge is "convex" such that the two adjacent edges would intersect outside the polygon, then consider the polygon that would result from removing a convex edge and intersecting the corresponding adjacent edges. The increase in area and the increase in edge length that would result from using this alternative polygon may be considered. For example, the "convex" edge that would have the smallest area increase may be removed, as long as the increase in area and edge length are both below specified thresholds. For example, the input polygon 1400 of FIG. 14A may be simplified to obtain the simplified polygon 1450 of FIG. 14B. For example, the process 800 of FIG. 8 may be implemented to simplify a two-dimensional polygon representing a facet suggestion. This simplified polygon may be presented to the user. The user may then move vertices of the polygon, add vertices, or remove vertices in the plane of the overview image to better fit the desired facet as it appears to the user in the overview image. To fit the final facet, all the surface points are projected into the image and RANSAC is run on them to find the three-dimensional plane on which the facet lies. Then the two-dimensional vertices of the polygon in the image may be intersected with this plane to determine the polygon in the facet plane, where the determined polygon is the final facet. The surface points of the three-dimensional map that belong to this facet may be ignored when suggesting or fitting subsequent facets. For example, generating 620 one or more facets based on the three-dimensional map may include implementing the process 700 of FIG. 7 to solicit user feedback on the suggested facets.

The process 600 includes generating 630 a scan plan based on the one or more facets. The scan plan includes a sequence of poses for an unmanned aerial vehicle to assume to enable capture, using one or more image sensors (e.g., including the image sensor 220) of the unmanned aerial vehicle, of images of the roof at a consistent distance (e.g., one meter) from each of the one or more facets. A pose in the sequence of poses may include a position of the unmanned aerial vehicle (e.g., a tuple of coordinates x, y, and z), an orientation (e.g., a set of Euler angles or a quaternion) of an unmanned aerial vehicle. In some implementations a pose may include an orientation of a image sensor of the unmanned aerial vehicle with respect to the unmanned aerial vehicle or with respect to another coordinate system. Once the set of facets have been generated, the unmanned aerial vehicle may plan a path to capture imagery of all the facets at a desired ground sampling distance (GSD). Once the path is generated, the path may be presented to the user via a graphical user interface (e.g., a live augmented reality (AR) display) for the user to approve or reject. For example, the graphical user interface 550 of FIG. 5B may be used to present a scan plan to a user for approval. In some implementations, the process 600 includes capturing, using the one or more image sensors, an overview image of the roof; presenting a graphical representation of the scan plan overlaid on the overview image; and receiving an indication of an approval of the scan plan from the user.

The scan plan may be generated 630 based on the one or more facets and some scan plan configuration parameters, such as distance from surface and vertical overlap and horizontal overlap between fields of view of the one or more image sensors at different poses in the sequence of poses of the scan plan. For example, the sequence of poses of the scan plan may be for orthographic imaging of each of the one or more facets.

The process 600 includes controlling 640 a propulsion mechanism of an unmanned aerial vehicle (e.g., the unmanned aerial vehicle 200) to cause the unmanned aerial vehicle to fly to assume a pose corresponding to one of the sequence of poses of the scan plan; and capturing 650, using the one or more image sensors (e.g., the image sensor 220), one or more images of the roof from the pose. For example, steps 640 and 650 may be repeated for each of the poses of the scan until images covering all of the one or more facets have been captured. In some implementations, the processing apparatus may be configured to stitch the captured images together to obtain a composite image of one or more surfaces of the roof. For example, stitching of the images may be performed based in part on out-of-band information associated with the images via a respective facet, such as three-dimensional map points associated with the facet or the boundaries of the one or more facets. For example, a processing apparatus (e.g., the processing apparatus 410) may use a propulsion controller interface (e.g., the propulsion control interface 442) to control 640 the propulsion mechanism (e.g., one or more propellers driven by electric motors).

During the scanning, the vehicle may fly the computed path while taking images. In addition to avoiding obstacles the vehicle may update the path dynamically for things like obstacle avoidance or improved image alignment. For example, while flying between poses in the sequence of poses of the scan plan, the process 600 may include detecting, based on images captured using the one or more image sensors, an obstacle; and dynamically adjusting a pose of the sequence of poses of the scan plan to avoid the obstacle. For example, while flying between poses in the sequence of poses of the scan plan, the vehicle may detect, based on images captured using the one or more image sensors, a deviation of points on a surface of the roof from one of the one or more facets; and dynamically adjust a pose of the sequence of poses of the scan plan to adapt to the deviation and maintain the consistent distance for image capture.

During the scanning, the operator can monitor the drone via the "frozen view" perspective (e.g., an overview image of the roof), or from the live video feed from the vehicle's cameras. The operator also has control to manually intervene during this phase.

When the unmanned aerial vehicle has either completed the scan, or must abort the scan (e.g., due to low battery, or a vehicle fault), the vehicle may automatically return to its take-off point and land. To the extent an unmanned aerial vehicle must land before completion of the scan plan, it may be useful to save a state of progress for the scan so that the unmanned aerial vehicle can pick up scanning where it left off after whatever condition that caused it to land is resolved. For example, the process 600 may include, after starting and before completing the scan plan, storing a scan plan state indicating a next pose of the sequence of poses of the scan plan; after storing the scan plan state, controlling the propulsion mechanism to cause the unmanned aerial vehicle to fly to land; after landing, controlling the propulsion mechanism to cause the unmanned aerial vehicle to fly to take off; accessing the scan plan state; and, based on the scan plan state, controlling the propulsion mechanism to cause the unmanned aerial vehicle to fly to assume the next pose and continue execution of the scan plan. A scan plan includes at least a sequence of poses of the unmanned aerial vehicle and may include more information. The poses may be encoded in various coordinate systems (e.g., a global coordinate system or a coordinate system with respect to a dock for the unmanned aerial vehicle or with respect to the roof being scan). The scan plan state, in combination with a visual inertial odometry (VIO) system, may be used to assume a next pose in the scan plan after recharging. For example, the unmanned aerial vehicle may automatically land on and, after automatically charging its battery, take off from the dock 300 of FIG. 3. In some implementations, controlling the propulsion mechanism to cause the unmanned aerial vehicle to fly to land includes: controlling a propulsion mechanism of an unmanned aerial vehicle to cause the unmanned aerial vehicle to fly to a first location in a vicinity of a dock (e.g., the dock 300) that includes a landing surface (e.g., the landing surface 310) configured to hold the unmanned aerial vehicle and a fiducial on the landing surface; accessing one or more images captured using an image sensor of the unmanned aerial vehicle; detecting the fiducial in at least one of the one or more images; determining a pose of the fiducial based on the one or more images; and controlling, based on the pose of the fiducial, the propulsion mechanism to cause the unmanned aerial vehicle to land on the landing surface. For example, the process 600 may include automatically charging a battery of the unmanned aerial vehicle using a charger included in the dock while the unmanned aerial vehicle is on the landing surface.

When execution of the scan plan is complete, the collected data (e.g., high resolution images of the surfaces of the roof and associated meta data) may be transmitted to another device (e.g., the controller 120 or a cloud server) for viewing or offline analysis. Estimates of the area of facet and/or a cost estimate of repairs to facet may be useful. In some implementations, the process 600 includes determining area estimates for each of the one or more facets; and presenting (e.g., transmitting, storing, or displaying) a data structure including the one or more facets, the area estimates of each of the one or more facets, and images of the roof captured during execution of the scan plan. In some implementations, a status report summarizing the progress or effectiveness of execution of the scan plan may be presented. For example, the process 900 of FIG. 9 may be implemented to generate and present a coverage report for the scan plan.

When the unmanned aerial vehicle lands, it may begin transferring data to the operator device. This data may include stitched composite images of each facet, the captured photos as well as metadata including the camera pose, and flight summary data (number of facets, photos captures, percentage of flight completed, flight time, etc.).

Figure 7:
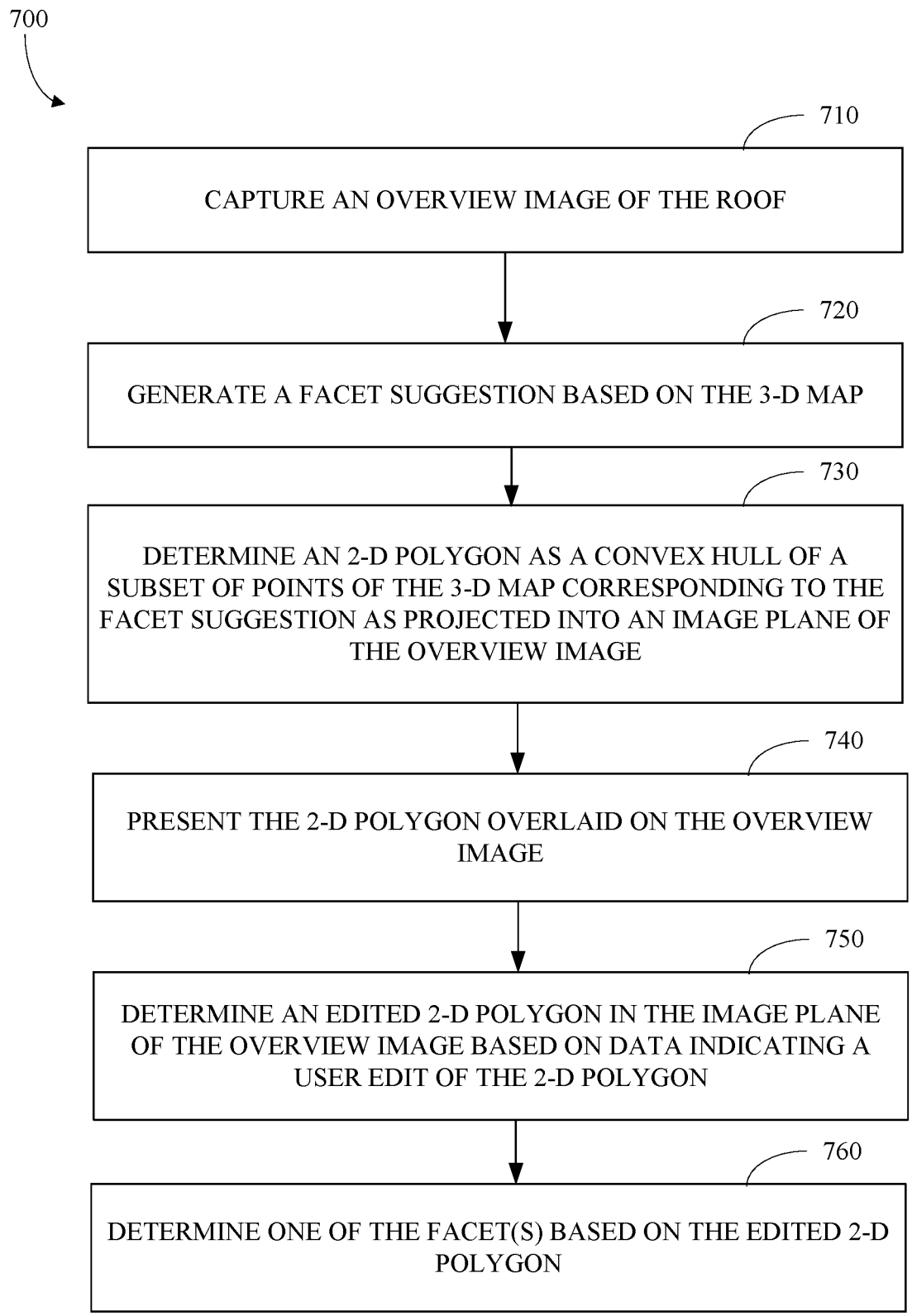
FIG. 7 is a flowchart of an example of a process for enabling user editing of facets.

FIG. 7 is a flowchart of an example of a process 700 for enabling user editing of facets. The process 700 includes capturing 710, using the one or more image sensors, an overview image of the roof; generating 720 a facet suggestion based on the three-dimensional map; determining 730 a two-dimensional polygon as a convex hull of a subset of points of the three-dimensional map, the subset of points corresponding to the facet suggestion, as projected into an image plane of the overview image; presenting 740 the two-dimensional polygon overlaid on the overview image; determining 750 an edited two-dimensional polygon in the image plane of the overview image based on data indicating a user edit of the two-dimensional polygon; and determining 760 one of the one or more facets based on the edited two-dimensional polygon. For example, the process 700 may be implemented by the unmanned aerial vehicle 110 of FIG. 1. For example, the process 700 may be implemented by the unmanned aerial vehicle 200 of FIGS. 2A-B. For example, the process 700 may be implemented using the hardware configuration 400 of FIG. 4.

The process 700 includes capturing 710, using the one or more image sensors (e.g., the image sensors (220-226), an overview image of the roof. The overview image may be used as "frozen view" of the roof that can form part of a graphical user interface for enabling a user to track the progress of execution of the scan plan and provide user feedback at various stages of the roof scan process. Incorporating the overview image in the graphical user interface may facilitate localization of user intents in relation to the roof being scanned by associating pixels of the graphical user interface with points on the three-dimensional surface of the roof in the three-dimensional map. For example, the overview image may be captured 710 from a pose far enough from the roof to have all of the roof appear within the field of view of an image sensor used to capture 710 the overview image.

The process 700 includes generating 720 a facet suggestion based on the three-dimensional map. For example, a facet suggestion may be generated 720 by searching for a largest expanse of coplanar points in the three-dimensional map with a low ratio of outlier points, and then fitting a plane to this subset of points. In some implementations isolated outlier points may be filtered out. User input may be used to identify a portion of facet that is of interest. For example, an overview image (e.g., a frozen view-point) of the roof may be presented in a graphical user interface (e.g., the graphical user interface 500) to a user. The user may click the center of a facet as it appears in the overview image. One or more points in the overview image at the location of the click interaction may be projected onto points of the three-dimensional map, or equivalently points from the top surface of the three-dimensional map are projected into the overview image and associated with the location of the click interaction. Once the mapping from the click interaction location to a small subset of points of the three-dimensional map is established, a plane may be fit (e.g., using Random Sample Consensus (RANSAC)) to this small subset of points. The entirety of the three-dimensional map surface may then be considered to select points that are coplanar with and adjacent to points of the small subset, and iteratively refine this subset. When the iteration converges, the resulting subset of points of the three-dimensional map is the basis of the facet suggestion.

The process 700 includes determining 730 a two-dimensional polygon as a convex hull of a subset of points of the three-dimensional map, the subset of points corresponding to the facet suggestion, as projected into an image plane of the overview image. A convex hull of these points as projected into the image may be computed to obtain the two-dimensional polygon in the image plane of the overview image. In some implementations, the two-dimensional polygon is simplified before it is presented 740. For example, the process 800 of FIG. 8 may be implemented to simplify the two-dimensional polygon.

The process 700 includes presenting 740 the two-dimensional polygon overlaid on the overview image. For example, the two-dimensional polygon overlaid on the overview image may be presented 740 as part of a graphical user interface (e.g., the graphical user interface 500 of FIG. 5A). For example, a processing apparatus of the unmanned aerial vehicle may present 740 the two-dimensional polygon overlaid on the overview image by transmitting (e.g., via a wireless communications network) data encoding the two-dimensional polygon overlaid on the overview image to a user computing device (e.g., the controller 120).

The process 700 includes determining 750 an edited two-dimensional polygon in the image plane of the overview image based on data indicating a user edit of the two-dimensional polygon. For example, the data indicating a user edit of the two-dimensional polygon may have been generated by a user interacting with a graphical user interface (e.g., the graphical user interface 500), such as by dragging a vertex icon (e.g., using the touchscreen 260) to move a vertex of the two-dimensional polygon within the plane of overview image. For example, the data indicating the user edit may be received by the unmanned aerial vehicle via a network communications interface (e.g., the communications interface 440).

The process 700 includes determining 760 one of the one or more facets based on the edited two-dimensional polygon. The edited two-dimensional polygon may be mapped at a new subset of the points of the three-dimensional map. In some implementations, all points of the three-dimensional map are projected onto the plane of the overview image, and those points with projections within the edited two-dimensional polygon are selected as members of the new subset of points that will be the basis of a new facet being determined 760. In some implementations, a reverse projection of the edited two-dimensional polygon is used to select the new subset of points that will be the basis of a new facet being determined 760. For example, determining 760 one of the one or more facets may include fitting a plane to the new subset of points, and computing a convex hull of the points in the new subset as projected onto the plane of the new facet.

Figure 8:
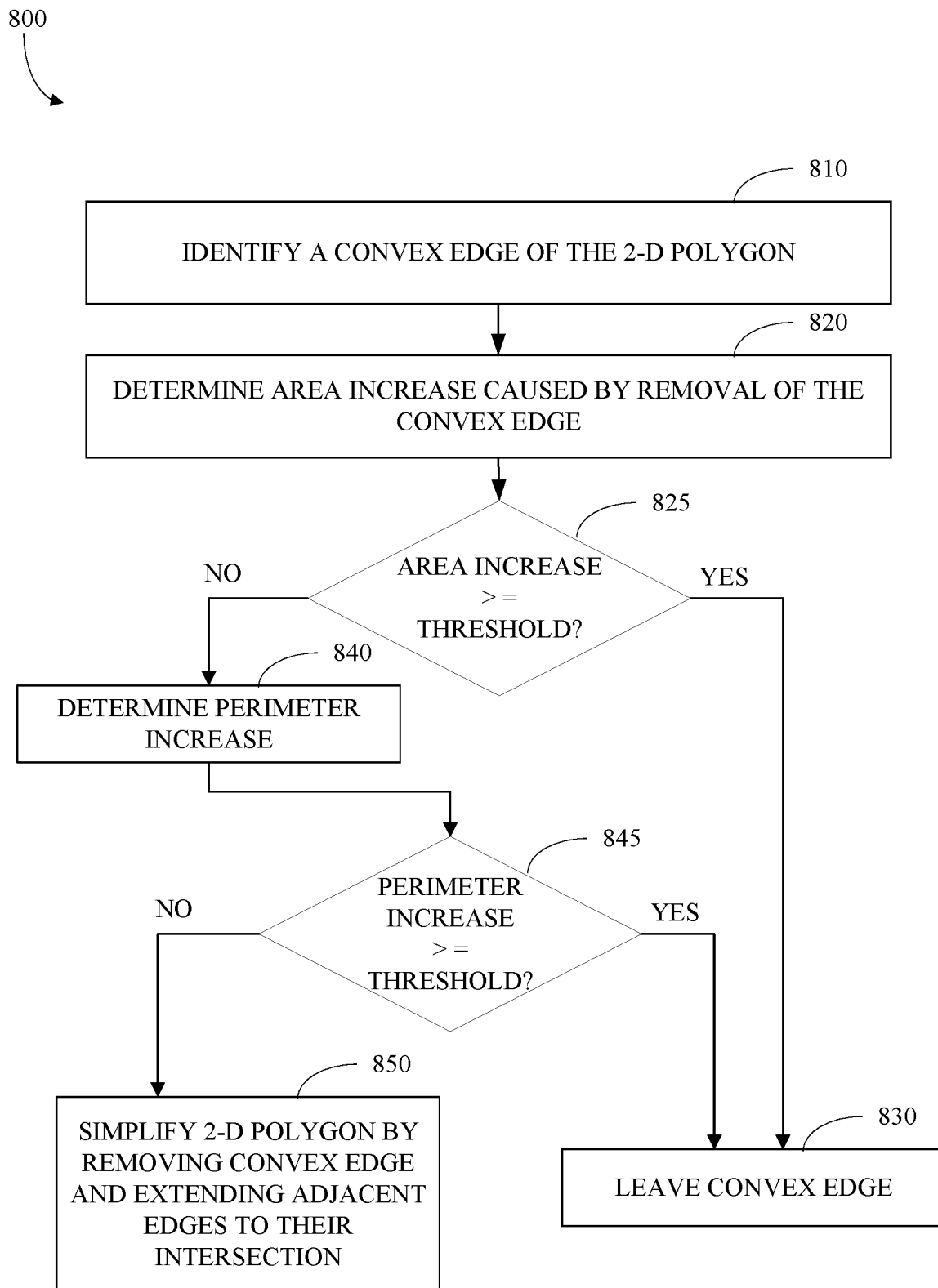
FIG. 8 is a flowchart of an example of a process for attempting to simply polygons representing facets by removing a convex edge.

FIG. 8 is a flowchart of an example of a process 800 for attempting to simply polygons representing facets by removing a convex edge. The process 800 includes identifying 810 a convex edge of the two-dimensional polygon; determining 820 an area increase caused by removal of the convex edge; at step 825, checking that removal of the convex edge increases area of the two-dimensional polygon by an amount less than a threshold; if (at step 825) the area increase is greater than or equal to a threshold (e.g., 10% increase), then leave 830 the convex edge in the two-dimensional polygon and repeat the process 800 as needed for any other convex edges in the two-dimensional polygon. If (at step 825) the area increase is not greater than a threshold (e.g., 10% increase), then determine 840 the perimeter increase caused by removal of the convex edge; at step 845, checking that removal of the convex edge increases perimeter of the two-dimensional polygon by an amount less than a threshold (e.g., 10% increase); if (at step 845) the perimeter increase is greater than or equal to a threshold (e.g., 10% increase), then leave 830 the convex edge in the two-dimensional polygon and repeat the process 800 as needed for any other convex edges in the two-dimensional polygon. If (at step 845) the increase is less than a threshold (e.g., 10% increase), then simplify 850 the two-dimensional polygon by removing a convex edge from the two-dimensional polygon and extending edges of the two-dimensional polygon adjacent to the convex edge to a point at which the extended edges intersect each other. The process 800 may be repeated as needed for any other convex edges in the two-dimensional polygon. In some implementations, only perimeter increase caused by removal of a convex edge is checked. In some implementations, only area increase caused by removal of a convex edge is checked. For example, the process 800 may implemented to simplify the input polygon 1400 of FIG. 14A to obtain the simplified polygon 1450 of FIG. 14B. For example, the process 800 may be implemented by the unmanned aerial vehicle 110 of FIG. 1. For example, the process 800 may be implemented by the unmanned aerial vehicle 200 of FIGS. 2A-B. For example, the process 800 may be implemented using the hardware configuration 400 of FIG. 4.

Figure 9:
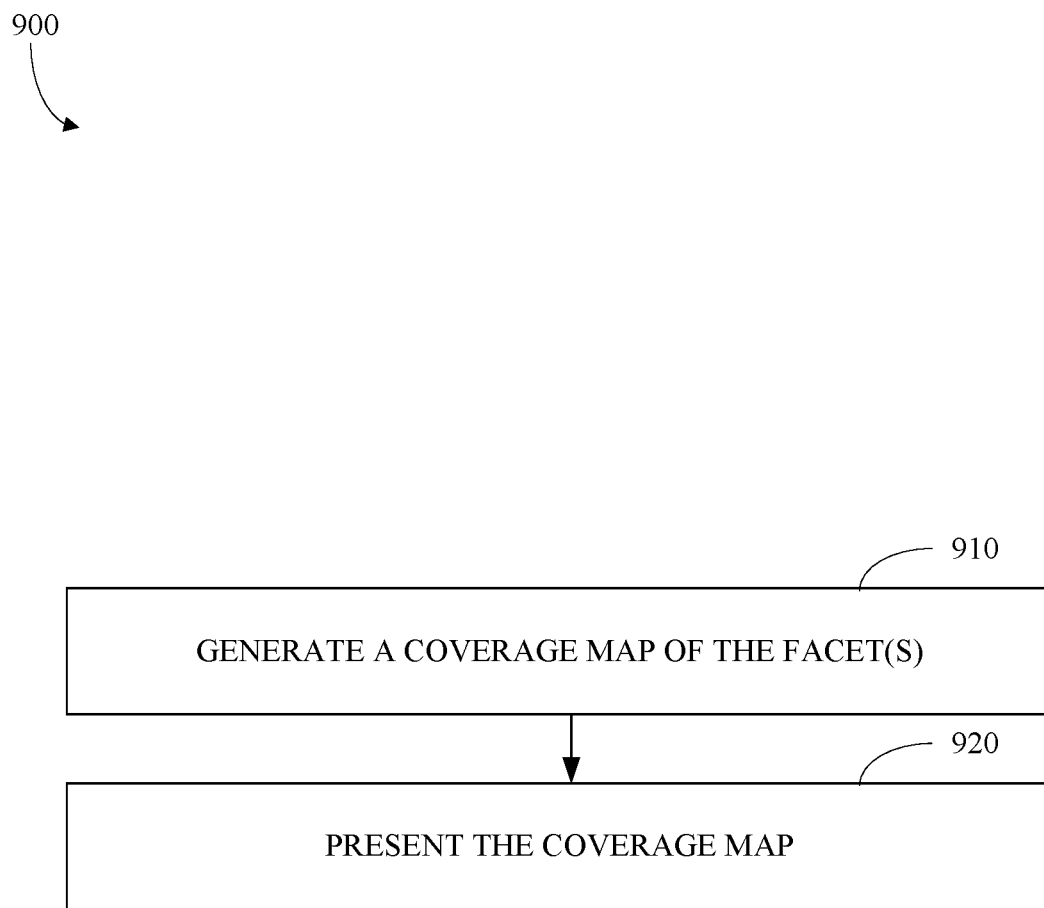
FIG. 9 is a flowchart of an example of a process for presenting coverage information for a scan of a roof.

FIG. 9 is a flowchart of an example of a process 900 for presenting coverage information for a scan of a roof. The process 900 includes generating 910 a coverage map of the one or more facets indicating which of the one or more facets have been successfully imaged during execution of the scan plan; and presenting 920 the coverage map. The unmanned aerial vehicle may also compute image coverage of the selected facets on board so the operator can ensure that all data was captured. If a facet is determined to not have adequate coverage, an application on an operator device (e.g., the controller 120) may indicate where the coverage gap is and direct action to get coverage (e.g., either generate an automated path to capture the missing imagery or direct the operator to manually fly the unmanned aerial vehicle to capture the image). For example, the process 900 may be implemented by the unmanned aerial vehicle 110 of FIG. 1. For example, the process 900 may be implemented by the unmanned aerial vehicle 200 of FIGS. 2A-B. For example, the process 900 may be implemented using the hardware configuration 400 of FIG. 4.

Figure 10:
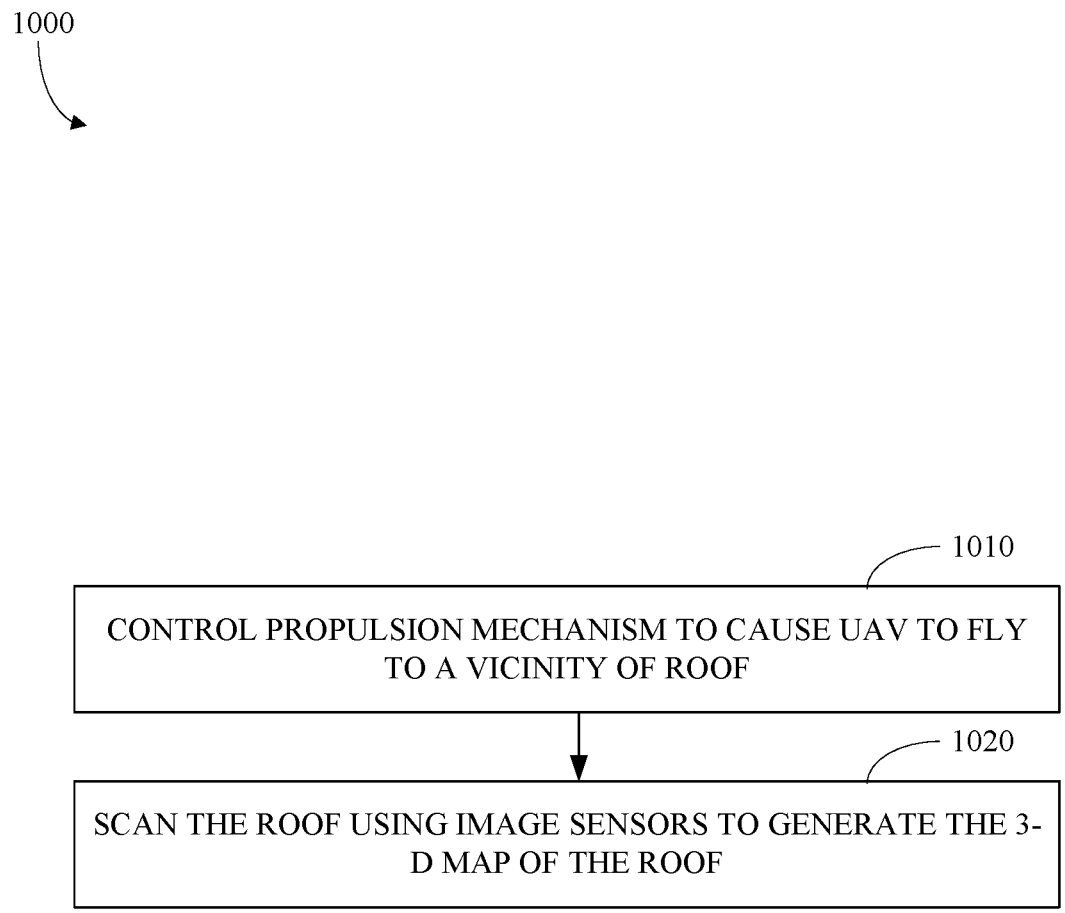
FIG. 10 is a flowchart of an example of a process for generating a three-dimensional map of a roof.

FIG. 10 is a flowchart of an example of a process 1000 for generating a three-dimensional map of a roof. The process 1000 includes controlling 1010 the propulsion mechanism to cause the unmanned aerial vehicle to fly to a vicinity of the roof; and scanning 1020 the roof using one or more image sensors, which are configured to support stereoscopic imaging used to provide range data, to generate the three-dimensional map of the roof. For example, the three-dimensional map may include a voxel occupancy map or a signed distance map. For example, the process 1100 of FIG. 11 may be implemented to scan 1020 a roof. In some implementations, the scanning is performed from a single pose sufficiently far from the roof for the entire roof to be within the field of view of the one or more image sensors (e.g., the image sensors 224, 225, and 226). For example, the process 1000 may be implemented by the unmanned aerial vehicle 110 of FIG. 1. For example, the process 1000 may be implemented by the unmanned aerial vehicle 200 of FIGS. 2A-B. For example, the process 1000 may be implemented using the hardware configuration 400 of FIG. 4.

Figure 11:
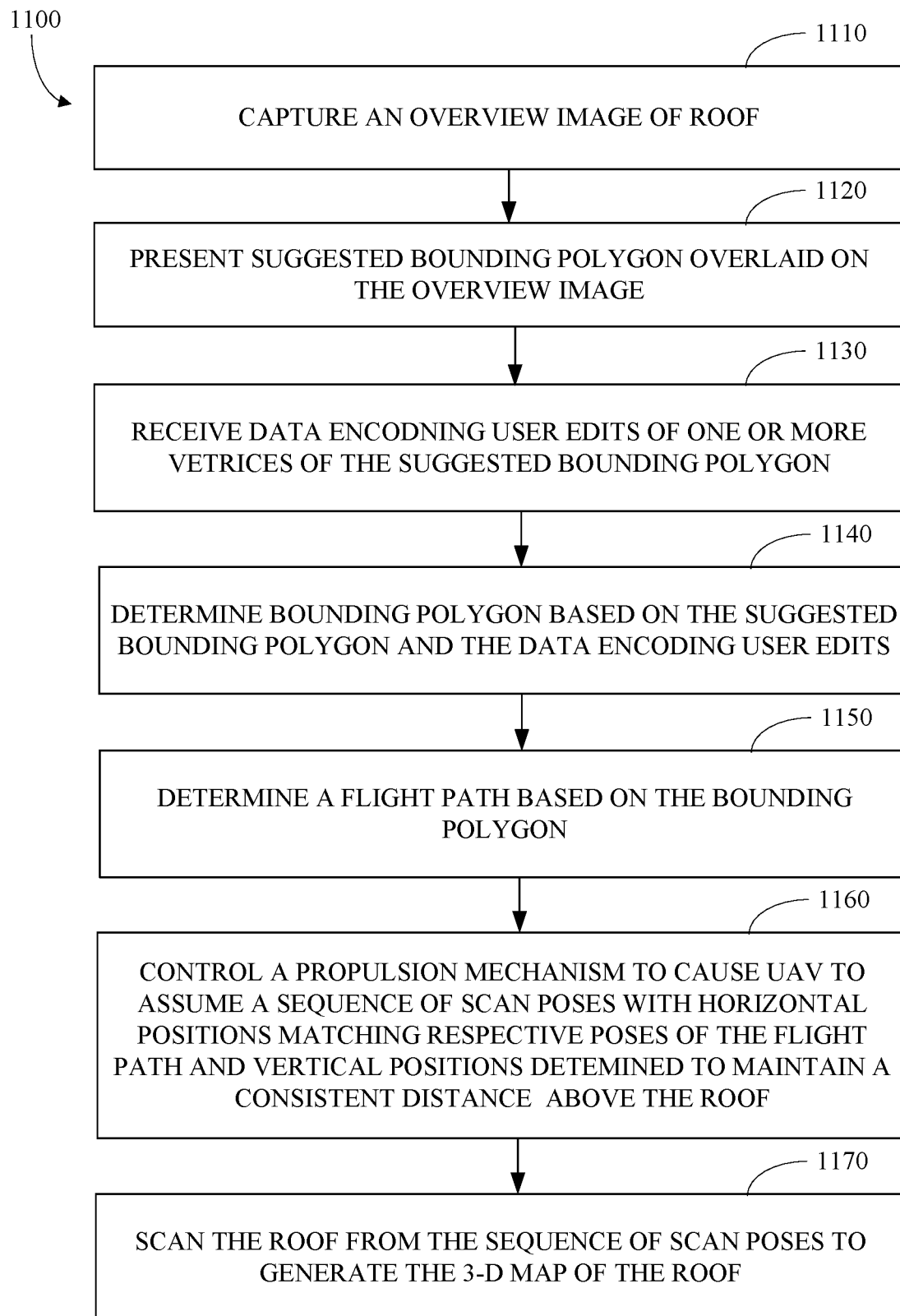
FIG. 11 is a flowchart of an example of a process for generating a three-dimensional map of a roof.

FIG. 11 is a flowchart of an example of a process 1100 for generating a three-dimensional map of a roof. The process 1100 includes capturing 1110 an overview image of a roof of a building from a first pose of an unmanned aerial vehicle positioned above the roof; presenting 1120 a graphical representation of a suggested bounding polygon overlaid on the overview image to a user; accessing 1130 data encoding user edits of one or more of the vertices of the suggested bounding polygon; determining 1140 a bounding polygon based on the suggested bounding polygon and the data encoding user edits; determining 1150 a flight path based on the bounding polygon; controlling 1160 a propulsion mechanism to cause the unmanned aerial vehicle to fly to assume a sequence of scan poses with horizontal positions matching respective poses of the flight path and vertical positions determined to maintain a consistent distance above the roof; and scanning 1170 the roof from the sequence of scan poses to generate a three-dimensional map of the roof. For example, the process 1100 may be implemented by the unmanned aerial vehicle 110 of FIG. 1. For example, the process 1100 may be implemented by the unmanned aerial vehicle 200 of FIGS. 2A-B. For example, the process 1100 may be implemented using the hardware configuration 400 of FIG. 4.

The process 1100 includes capturing 1110, using one or more image sensors (e.g., the image sensor 220) of an unmanned aerial vehicle (e.g., the unmanned aerial vehicle 200), an overview image of a roof of a building from a first pose of the unmanned aerial vehicle positioned above the roof. The overview image may be used as "frozen view" of the roof that can form part of a graphical user interface for enabling a user to track the progress of the unmanned aerial vehicle along a flight path (e.g., a dynamic surface-relative flight path) that will be used for generating a three-dimensional map of the roof and provide user feedback at various stages of the scanning procedure. Incorporating the overview image in a graphical user interface may facilitate localization of user intents in relation to the roof being scanned by associating pixels of the graphical user interface with parts of the roof. For example, the overview image may be captured 1110 from a pose far enough from the roof to have all of the roof appear within the field of view of an image sensor used to capture 1110 the overview image.

In some implementations, the unmanned aerial vehicle may be configured to automatically fly to assume the pose that is used to capture 1110 the overview image of the roof. For example, a user may initially set the vehicle on the ground, pointing in the direction of the building with the roof to be scanned. The user may engage a "takeoff" icon in a user interface of the unmanned aerial vehicle, which may cause the unmanned aerial vehicle to take off, move in a diagonal direction to up and over the target building of interest, and fly up high enough to look directly downwards at the roof of the building below and capture 1110 all of the relevant area in a field of view its one or more image sensors (e.g., the image sensor 220). In some implementations, the unmanned aerial vehicle may be manually controlled to assume the pose that is used to capture 1110 the overview image of the roof, and the process 1100 may be initiated once the unmanned vehicle has been so positioned.

The process 1100 includes presenting 1120 a graphical representation of a suggested bounding polygon overlaid on the overview image to a user. The suggested bounding polygon includes vertices corresponding to respective vertex icons of the graphical representation that enable the user to move the vertices within a plane. For example, the suggested bounding polygon may be a rectangle in a horizontal plane. In some implementations the suggested bounding polygon (e.g., a triangle, a rectangle, a pentagon, or a hexagon) is overlaid in the center of the overview image and has a fixed default size. In some implementations the suggested bounding polygon generated by using computer vision processing to identify the perimeter of the roof as it appears in the overview image and generating a suggested boundary polygon that corresponds closely to the identified perimeter of the roof. In some implementations (e.g., where the overview image is captured from an oblique perspective), the suggested bounding polygon is projected from a horizontal plane into a plane of the of the overview image before being overlaid on the overview image. For example, the graphical representation of a suggested bounding polygon may be presented 1120 as part of a graphical user interface (e.g., the graphical user interface 1300 of FIGS. 13A-B). For example, a processing apparatus (e.g., the processing apparatus 410) of the unmanned aerial vehicle may present 1120 the graphical representation of the suggested bounding polygon overlaid on the overview image by transmitting (e.g., via a wireless communications network) data encoding the graphical representation of the suggested bounding polygon overlaid on the overview image to a user computing device (e.g., the controller 120).

The process 1100 includes accessing 1130 data encoding user edits of one or more of the vertices of the suggested bounding polygon. The user may use a computing device (e.g., the controller 120, a tablet, a laptop, or a smartphone to receive, interpret, and/or interact a graphical user interface in which the suggested bounding polygon has been presented 1120. For example, a user may use a touchscreen to interact with one or more of the vertex icons to move vertices of the suggested bounding polygon to edit the suggested bounding polygon to correspond to a perimeter of the roof to be scanned as the roof appears in the overview image. The user may use their computing device to encode these edits to one or more vertices of the suggested bounding polygon in data, which may be transmitted to a device implementing the process 1100 (e.g., unmanned aerial vehicle 200), which in turn receives the data. For example, the data may include modified coordinates in a plane of vertices of the suggested bounding polygon. The data encoding user edits of one or more of the vertices of the suggested bounding polygon may be accessed 1130 in variety of ways. For example, the data encoding user edits of one or more of the vertices of the suggested bounding polygon may be accessed 1130 by receiving from a remote computing device (e.g., the controller 120) via a communication interface (e.g., the communication interface 440). For example, the data encoding user edits of one or more of the vertices of the suggested bounding polygon may be accessed 1130 by reading from a memory (e.g., the data storage device 420) via an interconnect (e.g., the interconnect 450).

The process 1100 includes determining 1140 a bounding polygon based on the suggested bounding polygon and the data encoding user edits. The data encoding user edits may be incorporated to update one or more vertices of the suggested bounding polygon to determine 1140 the bounding polygon. In some implementations (e.g., where the overview image is captured from an oblique perspective), the bounding polygon is projected from a plane of the of the overview image into a horizontal plane. For example, the bounding polygon may be a geofence for the unmanned aerial vehicle.

The process 1100 includes determining 1150 a flight path (e.g., a dynamic surface-relative flight path) based on the bounding polygon. The flight path includes a sequence of poses of the unmanned aerial vehicle with respective fields of view at a fixed height that collectively cover the bounding polygon. For example, the flight path may be determined as a lawn-mower pattern. In some implementations, a user also inputs or selects (e.g., using the user interface that was used to edit the suggested bounding polygon) an approximate height (e.g., above the ground) that, together with the bounding polygon, defines a volume in which the roof is expected to lie in three-dimensional space. For example, a bounding box in three-dimensional space may be determined based on this height parameter and the bounding polygon, and the flight path may be determined 1150 based on the bounding box. In some implementations, additional parameters of a three-dimensional scanning operation may be specified or adjusted by a user. For example, the flight path may be determined 1150 based on one or more scan parameters presented for selection by the user, including one or more parameters from a set of parameters including a grid size, a nominal height above a surface of the roof, and a top flight speed.

The process 1100 includes controlling 1160 a propulsion mechanism to cause the unmanned aerial vehicle to fly to assume a sequence of scan poses with horizontal positions matching respective poses of the flight path (e.g., a dynamic surface-relative flight path) and vertical positions determined to maintain a consistent distance (e.g., 3 meters or 5 meters) above the roof. The unmanned aerial vehicle may be configured to automatically detect and avoid obstacles (e.g., a chimney, or tree branch) encountered during a scan procedure. For example, while flying between poses in the sequence of scan poses, an obstacle may be detected based on images captured using one or more image sensors (e.g., the images sensors 220-226) of the unmanned aerial vehicle; and a pose of the flight path may be dynamically adjusted to avoid the obstacle. For example the roof may be scanned to generate the three-dimensional map from a distance greater than a consistent distance used for facet imaging (e.g., using the process 600 of FIG. 6), which may be safer and faster for scanning 1170 to generate the three-dimensional map of the roof. For example, a processing apparatus (e.g., the processing apparatus 410) may use a propulsion controller interface (e.g., the propulsion control interface 442) to control 1160 the propulsion mechanism (e.g., one or more propellers driven by electric motors).

In some implementations, after a three-dimensional bounding box is defined, a few points of interest such as oblique views at the corners of a roof (e.g., from high up, looking in) are generated and flown. The unmanned aerial vehicle may then fly the flight path (e.g., a dynamic surface-relative flight path) to generate a three-dimensional map of the roof.

The process 1100 includes scanning 1170 the roof from the sequence of scan poses to generate a three-dimensional map of the roof. For example, the three-dimensional map may include a voxel occupancy map or a signed distance map. For example, the one or more image sensors may be configured to support stereoscopic imaging used to provide range data, and the roof may be scanned 1170 using the one or more image sensors to generate the three-dimensional map of the roof. In some implementations, the unmanned aerial vehicle may include other types of range or distance sensors (e.g., a lidar sensor or a radar sensor). For example, the roof may be scanned 1170 using a radar sensor to generate the three-dimensional map of the roof. For example, the roof may be scanned 1170 using a lidar sensor to generate the three-dimensional map of the roof.

The three-dimensional map (e.g., a voxel map) may be built by fusing stereo range images from onboard image sensors. For example, voxels of a three-dimensional map may be marked as occupied or free space. Surface voxels may be a subset of occupied voxels adjacent to free space. In some implementations, surface voxels can be just the highest occupied voxel in each horizontal (x, y) location.

For example, the three-dimensional map may be a signed distance map. The three-dimensional map may be built by fusing stereo range images from onboard image sensors. The three-dimensional map may be represented as a dense voxel grid of signed distance values. For example, the signed distance map may be a truncated signed distance field (TSDF). The values may be updated by projecting voxel centers into range images and updating a weighted average of signed distance values. The top surface of the signed distance map may be computed by ray-marching, with rays selected at a desired resolution. In some implementations, an implicit surface location of the signed distance function (e.g., the zero-crossing) may be interpolated along the ray for increased accuracy.

In some cases, it may be advantageous to pause a scanning procedure, such as when the unmanned aerial vehicle needs to be recharged. Maintaining a low-drift visual-inertial odometry (VIO) estimate of the position of the unmanned aerial vehicle as it moves may enable pause with relatively seamless continuation of scanning procedure after carrying out an intervening task, such as recharging. For example, the process 1100 may include storing a scan state indicating a next pose of the sequence of poses of the flight path; after storing the scan state, controlling the propulsion mechanism to cause the unmanned aerial vehicle to fly to land (e.g., on the dock 300); after landing, controlling the propulsion mechanism to cause the unmanned aerial vehicle to take off; accessing the scan state; and based on the scan state, controlling the propulsion mechanism to cause the unmanned aerial vehicle to fly to assume a pose in the sequence of scan poses corresponding to the next pose and continue scanning 1170 the roof to generate the three-dimensional map.

Figure 12:
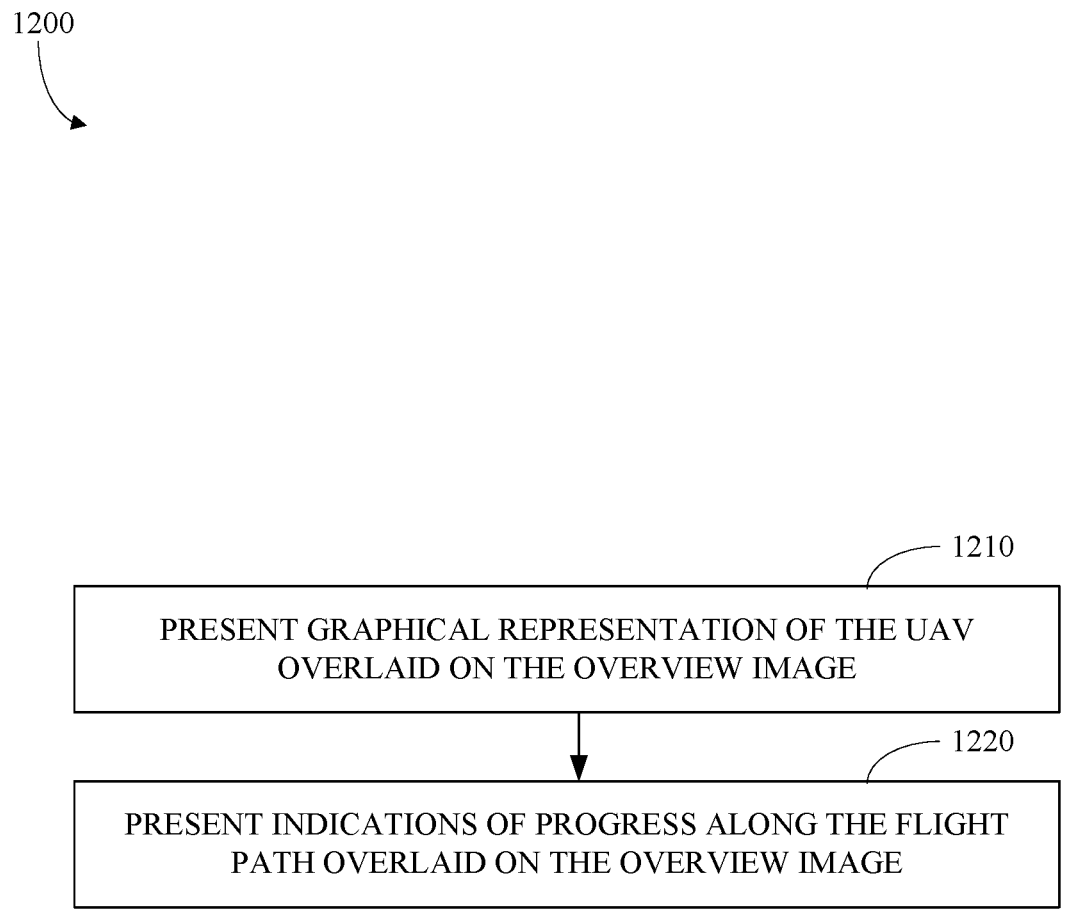
FIG. 12 is a flowchart of an example of a process for presenting status information for a scan of a roof.

FIG. 12 is a flowchart of an example of a process 1200 for presenting progress information for a scan of a roof. For example, the scan may be performed (e.g., using the process 1100 of FIG. 11) to generate a three-dimensional map of the roof. The process 1200 includes presenting 1210 a graphical representation of the unmanned aerial vehicle overlaid on the overview image; and presenting 1220 indications of progress along the flight path (e.g., a dynamic surface-relative flight path) overlaid on the overview image. The overview image used as a "frozen view-point" in a user interface of the unmanned aerial vehicle. As the unmanned aerial vehicle continues to fly closer to the roof, the background image shown within the user interface may be frozen at the overview image, but additional status information about a scan procedure being conducted may be updated and overlaid on this background image to provide spatial context for the status information. For example, the process 1200 may be implemented by the unmanned aerial vehicle 110 of FIG. 1. For example, the process 1200 may be implemented by the unmanned aerial vehicle 200 of FIGS. 2A-B. For example, the process 1200 may be implemented using the hardware configuration 400 of FIG. 4.

The process 1200 includes presenting 1210 a graphical representation of the unmanned aerial vehicle overlaid on the overview image. The graphical representation of the unmanned aerial vehicle corresponds to a current horizontal position of the unmanned aerial vehicle. In some implementations, the graphical representation of the unmanned aerial vehicle includes a three-dimensional rendering of the unmanned aerial vehicle. For example, a three-dimensional rendering of the unmanned aerial vehicle may be drawn in the user interface, correctly in perspective to for a physical location (e.g., a current position or a planned position) of the unmanned aerial vehicle. For example, a physical location of the unmanned aerial vehicle in relation to the roof, as viewed from the perspective of the overview image, may be determined by maintaining a low-drift visual-inertial odometry (VIO) estimate of the position of the unmanned aerial vehicle as it moves. Presenting 1210 the graphical representation of the unmanned aerial vehicle (e.g., a three-dimensional rendering) may allow a user to see the unmanned aerial vehicle in the e context of the overview image to better understand where the unmanned aerial vehicle is in relation to the roof and the scanning procedure at hand. For example, the graphical representation of the unmanned aerial vehicle may be presented 1210 as part of a graphical user interface (e.g., the graphical user interface 1300 of FIGS. 13A-B). For example, a processing apparatus (e.g., the processing apparatus 410) of the unmanned aerial vehicle may present 1210 the graphical representation of the unmanned aerial vehicle overlaid on the overview image by transmitting (e.g., via a wireless communications network) data encoding the graphical representation of the unmanned aerial vehicle overlaid on the overview image to a user computing device (e.g., the controller 120).

The process 1200 includes presenting 1220 indications of progress along the flight path (e.g., a dynamic surface-relative flight path) overlaid on the overview image. For example, indications of progress along the flight path may include color coding sections of the roof that have been successfully scanned from a pose corresponding to a pose of the flight path. Presenting 1220 the indications of progress along the flight path may allow a user to see the state of a three-dimensional scan procedure and/or geometry estimation and path planning in future steps. For example, the indications of progress along the flight path may be presented 1220 as part of a graphical user interface (e.g., the graphical user interface 1300 of FIGS. 13A-B). For example, a processing apparatus (e.g., the processing apparatus 410) of the unmanned aerial vehicle may present 1220 indications of progress along the flight path overlaid on the overview image by transmitting (e.g., via a wireless communications network) data encoding the indications of progress along the flight path overlaid on the overview image to a user computing device (e.g., the controller 120).

Figure 13A:
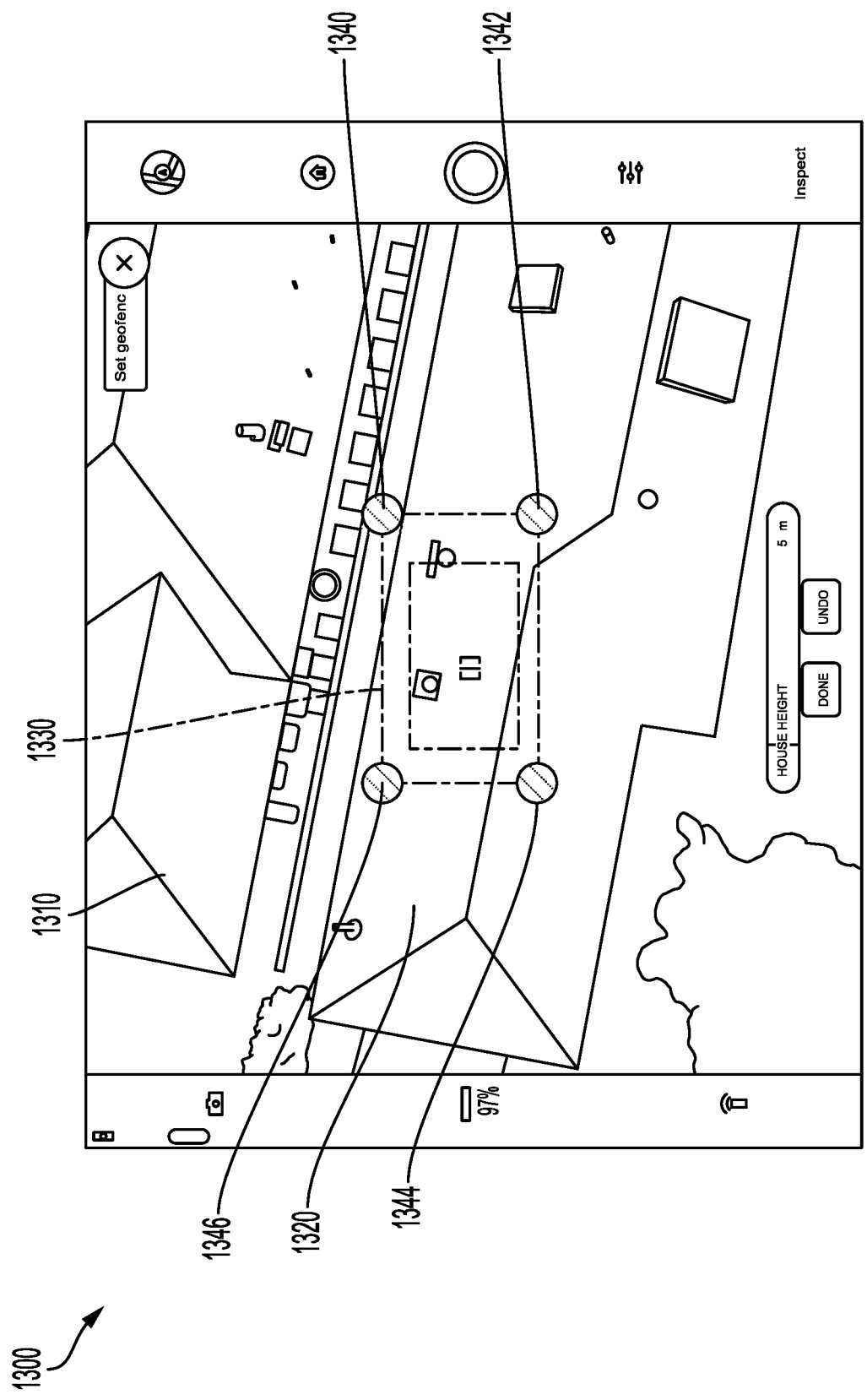
FIG. 13A is an illustration of an example of a graphical user interface of an unmanned aerial vehicle that is used to present a suggested bounding polygon overlaid on an overview image of a roof to enable editing of a bounding polygon to facilitate scanning of the roof.

FIG. 13A is an illustration of an example of a graphical user interface 1300 of an unmanned aerial vehicle (e.g., the unmanned aerial vehicle 200) that is used to present a suggested bounding polygon overlaid on an overview image of a roof to enable editing of a bounding polygon to facilitate scanning of the roof. The graphical user interface 1300 includes an overview image 1310 that includes a view of a roof 1320 of a building. The graphical user interface 1300 also includes a graphical representation of suggested bounding polygon 1330 that is overlaid on the overview image 1310. The graphical representation of suggested bounding polygon includes vertex icons 1340, 1342, 1344, and 1346 corresponding to respective vertices of the suggested bounding polygon. A user may interact (e.g., using a touchscreen of their computing device) with one or more of the vertex icons 1340, 1342, 1344, and 1346 to move the corresponding vertices of the suggested bounding polygon.

Figure 13B:
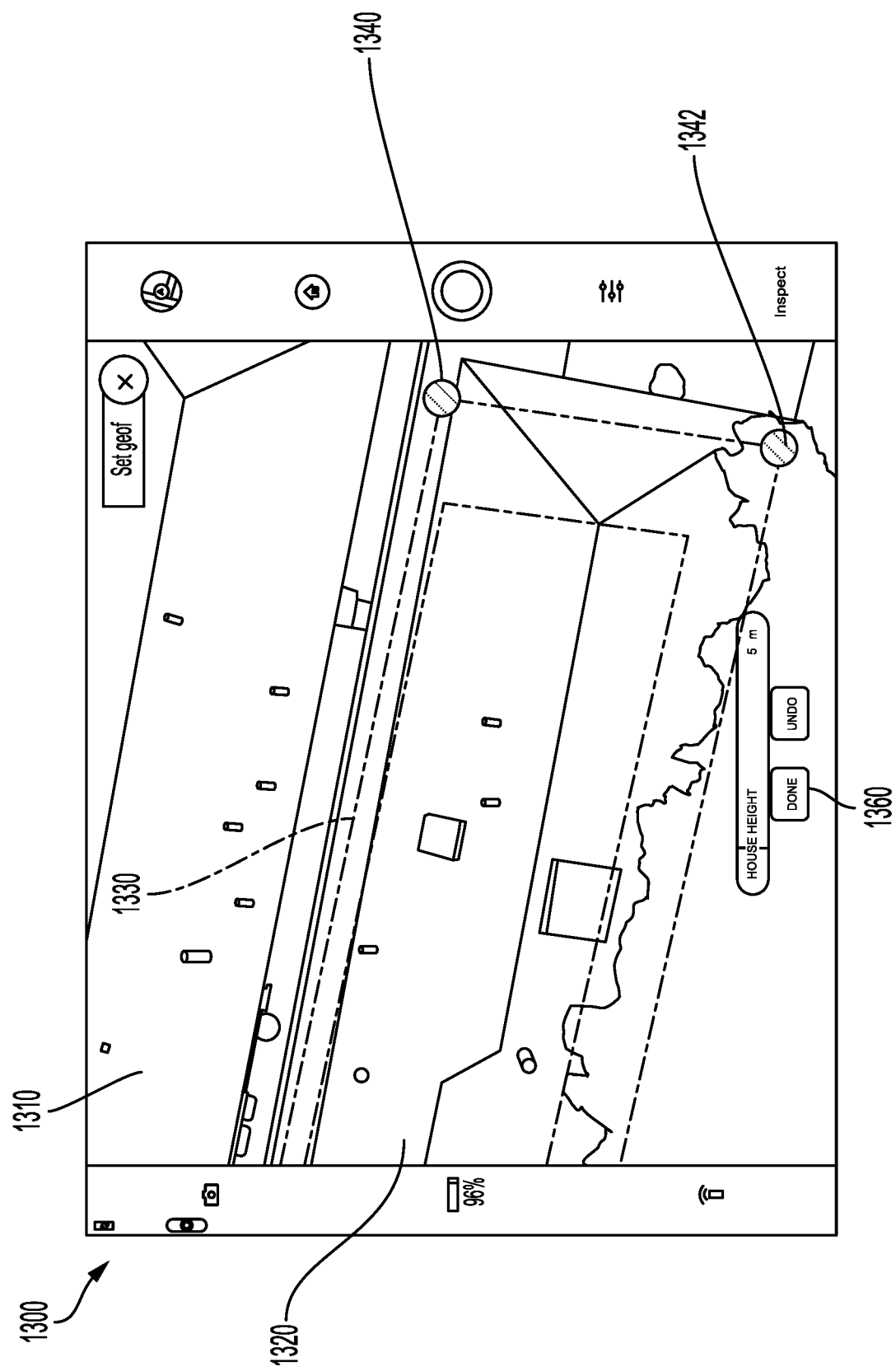
FIG. 13B is an illustration of an example of a graphical user interface of an unmanned aerial vehicle that is used to present a suggested bounding polygon overlaid on an overview image of a roof to enable editing of a bounding polygon to facilitate scanning of the roof.

FIG. 13B is an illustration of an example of the graphical user interface 1300 of an unmanned aerial vehicle that is used to present a suggested bounding polygon overlaid on an overview image of a roof to enable editing of a bounding polygon to facilitate scanning of the roof. FIG. 13B shows the graphical user interface 1300 after the user has interacted with the vertex icons 1340, 1342, 1344, and 1346 to edit the suggested bounding polygon to correspond to a perimeter of the roof to be scanned. In this example, the user has used a zoom feature of the graphical user interface 1300 to zoom in on a portion of the overview image 1310 to facilitate finer adjustment on the positions of the vertex icon 1340 and the vertex icon 1342. When the user is finished editing the suggested bounding polygon, the user may indicate completion by interacting with a bounding polygon approval icon 1360.

Figure 14A:
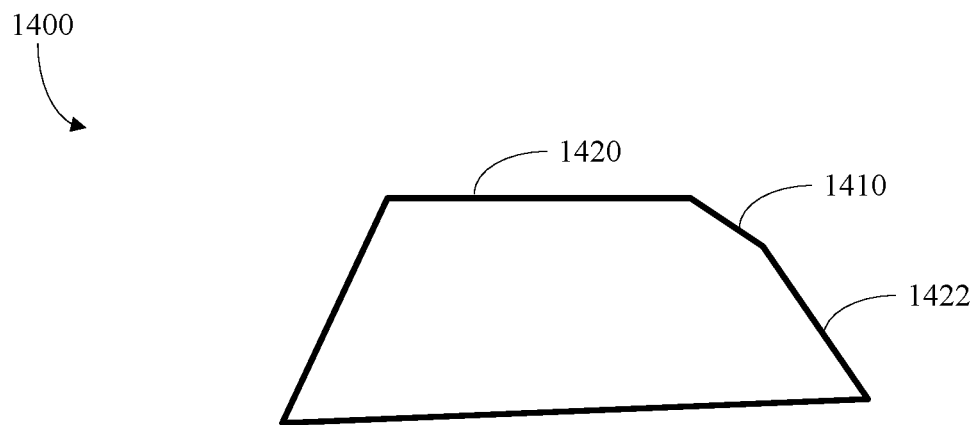
FIG. 14A is an illustration of an example of an input polygon, which may be associated with a facet.

FIG. 14A is an illustration of an example of an input polygon 1400, which may be associated with a facet. The input polygon 1400 has a convex edge 1410 with adjacent edges 1420 and 1422 that would intersect if extended outside of the input polygon 1400. The input polygon 1400 may be simplified by removing a convex edge and extending its adjacent edges to reduce the number of edges and vertices.

Figure 14B:
FIG. 14B is an illustration of an example of a simplified polygon determined based on the input polygon of FIG. 14A.
Figure 14B:
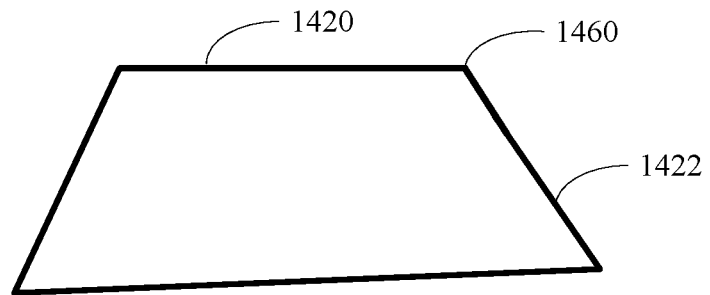

FIG. 14B is an illustration of an example of a simplified polygon 1450 determined based on the input polygon 1400 of FIG. 14A. For example, the process 800 of FIG. 8 may be implemented to simplify the input polygon 1400 to obtain the simplified polygon 1450. The convex edge 1410 has been identified and removed and the adjacent edges 1420 and 1422 have been extended to a point 1460 outside of the input polygon 1400 at which they intersect. If the resulting increase in perimeter and area of the simplified polygon 1450 with respect to the input polygon is sufficiently small, (e.g., below a threshold), then the simplified polygon 1450 may be used in lieu of the input polygon 1400.

Disclosed herein are implementations of roof scan using an unmanned aerial vehicle.

In a first aspect, the subject matter described in this specification can be embodied in systems that include an unmanned aerial vehicle comprising: a propulsion mechanism, one or more image sensors, and a processing apparatus, wherein the processing apparatus is configured to: access a three-dimensional map of a roof, wherein the three-dimensional map encodes a set of points in three-dimensional space on surfaces of the roof; generate one or more facets based on the three-dimensional map, wherein the one or more facets are respectively a polygon on a plane in three-dimensional space that is fit to a subset of the points in the three-dimensional map; generate a scan plan based on the one or more facets, wherein the scan plan includes a sequence of poses for the unmanned aerial vehicle that will enable capture, using the one or more image sensors, of images of the roof at a consistent distance from each of the one or more facets; control the propulsion mechanism to cause the unmanned aerial vehicle to fly to assume a pose corresponding to one of the sequence of poses of the scan plan; and capture, using the one or more image sensors, one or more images of the roof from the pose.

In a second aspect, the subject matter described in this specification can be embodied in methods that include accessing a three-dimensional map of a roof, wherein the three-dimensional map encodes a set of points in three-dimensional space on surfaces of the roof; generating one or more facets based on the three-dimensional map, wherein the one or more facets are respectively a polygon on a plane in three-dimensional space that is fit to a subset of the points in the three-dimensional map; generating a scan plan based on the one or more facets, wherein the scan plan includes a sequence of poses for an unmanned aerial vehicle that will enable capture, using one or more image sensors of the unmanned aerial vehicle, of images of the roof at a consistent distance from each of the one or more facets; controlling a propulsion mechanism of an unmanned aerial vehicle to cause the unmanned aerial vehicle to fly to assume a pose corresponding to one of the sequence of poses of the scan plan; and capturing, using the one or more image sensors, one or more images of the roof from the pose.

In a third aspect, the subject matter described in this specification can be embodied in a non-transitory computer-readable storage medium that includes instructions that, when executed by a processor, facilitate performance of operations comprising: accessing a three-dimensional map of a roof, wherein the three-dimensional map encodes a set of points in three-dimensional space on surfaces of the roof; generating one or more facets based on the three-dimensional map, wherein the one or more facets are respectively a polygon on a plane in three-dimensional space that is fit to a subset of the points in the three-dimensional map; generating a scan plan based on the one or more facets, wherein the scan plan includes a sequence of poses for an unmanned aerial vehicle that will enable capture, using one or more image sensors of the unmanned aerial vehicle, of images of the roof at a consistent distance from each of the one or more facets; controlling a propulsion mechanism of an unmanned aerial vehicle to cause the unmanned aerial vehicle to fly to assume a pose corresponding to one of the sequence of poses of the scan plan; and capturing, using the one or more image sensors, one or more images of the roof from the pose.

In a fourth aspect, the subject matter described in this specification can be embodied in unmanned aerial vehicles that include a propulsion mechanism, one or more image sensors, and a processing apparatus, wherein the processing apparatus is configured to: capture, using the one or more image sensors, an overview image of a roof of a building from a first pose of the unmanned aerial vehicle positioned above the roof; present a graphical representation of a suggested bounding polygon overlaid on the overview image to a user, wherein the suggested bounding polygon includes vertices corresponding to respective vertex icons of the graphical representation that enable the user to move the vertices within a plane; access data encoding user edits of one or more of the vertices of the suggested bounding polygon; determine a bounding polygon based on the suggested bounding polygon and the data encoding user edits; determine a flight path based on the bounding polygon, wherein the flight path includes a sequence of poses of the unmanned aerial vehicle with respective fields of view at a fixed height that collectively cover the bounding polygon; control the propulsion mechanism to cause the unmanned aerial vehicle to fly to assume a sequence of scan poses with horizontal positions matching respective poses of the flight path and vertical positions determined to maintain a consistent distance above the roof; and scan the roof from the sequence of scan poses to generate a three-dimensional map of the roof.

In a fifth aspect, the subject matter described in this specification can be embodied in methods that include capturing, using one or more image sensors of an unmanned aerial vehicle, an overview image of a roof of a building from a first pose of the unmanned aerial vehicle positioned above the roof; presenting a graphical representation of a suggested bounding polygon overlaid on the overview image to a user, wherein the suggested bounding polygon includes vertices corresponding to respective vertex icons of the graphical representation that enable the user to move the vertices within a plane; accessing data encoding user edits of one or more of the vertices of the suggested bounding polygon; determining a bounding polygon based on the suggested bounding polygon and the data encoding user edits; determining a flight path based on the bounding polygon, wherein the flight path includes a sequence of poses of the unmanned aerial vehicle with respective fields of view at a fixed height that collectively cover the bounding polygon; controlling a propulsion mechanism to cause the unmanned aerial vehicle to fly to assume a sequence of scan poses with horizontal positions matching respective poses of the flight path and vertical positions determined to maintain a consistent distance above the roof; and scanning the roof from the sequence of scan poses to generate a three-dimensional map of the roof.

In a sixth aspect, the subject matter described in this specification can be embodied in a non-transitory computer-readable storage medium that includes instructions that, when executed by a processor, facilitate performance of operations comprising: capturing, using one or more image sensors of an unmanned aerial vehicle, an overview image of a roof of a building from a first pose of the unmanned aerial vehicle positioned above the roof; presenting a graphical representation of a suggested bounding polygon overlaid on the overview image to a user, wherein the suggested bounding polygon includes vertices corresponding to respective vertex icons of the graphical representation that enable the user to move the vertices within a plane; accessing data encoding user edits of one or more of the vertices of the suggested bounding polygon; determining a bounding polygon based on the suggested bounding polygon and the data encoding user edits; determining a flight path based on the bounding polygon, wherein the flight path includes a sequence of poses of the unmanned aerial vehicle with respective fields of view at a fixed height that collectively cover the bounding polygon; controlling a propulsion mechanism to cause the unmanned aerial vehicle to fly to assume a sequence of scan poses with horizontal positions matching respective poses of the flight path and vertical positions determined to maintain a consistent distance above the roof; and scanning the roof from the sequence of scan poses to generate a three-dimensional map of the roof.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An unmanned aerial vehicle comprising:
   a propulsion mechanism,
   one or more image sensors, and a processing apparatus, wherein the processing apparatus is configured to:
  capture, using the one or more image sensors, an overview image of a roof of a building from a first pose of the unmanned aerial vehicle positioned above the roof;
  present a graphical representation of a suggested bounding polygon overlaid on the overview image to a user, wherein the suggested bounding polygon includes vertices corresponding to respective vertex icons of the graphical representation that enable the user to move the vertices within a plane;
  determine a bounding polygon based on the suggested bounding polygon and data encoding user edits of one or more of the vertices of the suggested bounding polygon; and
  determine a flight path based on the bounding polygon, wherein the flight path includes a sequence of poses of the unmanned aerial vehicle with respective fields of view at a fixed height that collectively cover the bounding polygon.

2. The unmanned aerial vehicle of claim 1, wherein the processing apparatus is configured to:
  control the propulsion mechanism to cause the unmanned aerial vehicle to fly to assume a sequence of scan poses with horizontal positions matching respective poses of the flight path and vertical positions determined to maintain a consistent distance above the roof; and
  scan the roof from the sequence of scan poses to generate a three-dimensional map of the roof.

3. The unmanned aerial vehicle of claim 1, wherein the processing apparatus is configured to:
  present a graphical representation of the unmanned aerial vehicle overlaid on the overview image, wherein the graphical representation of the unmanned aerial vehicle corresponds to a current horizontal position of the unmanned aerial vehicle.

4. The unmanned aerial vehicle of claim 2, wherein the graphical representation of the unmanned aerial vehicle includes a three-dimensional rendering of the unmanned aerial vehicle.

5. The unmanned aerial vehicle of claim 2, wherein the processing apparatus is configured to:
  present indications of progress along the flight path overlaid on the overview image.

6. The unmanned aerial vehicle of claim 1, wherein the processing apparatus is configured to:
  determine the flight path based on one or more scan parameters presented for selection by the user, including one or more parameters from a set of parameters including a grid size, a nominal height above a surface of the roof, and a top flight speed.

7. The unmanned aerial vehicle of claim 1, wherein the flight path is determined as a lawn-mower pattern.

8. The unmanned aerial vehicle of claim 1, wherein the one or more image sensors are configured to support stereoscopic imaging to provide range data, and wherein the processing apparatus is configured to:
  scan the roof using the one or more image sensors to generate the three-dimensional map of the roof.

9. The unmanned aerial vehicle of claim 7, wherein the roof is scanned to generate the three-dimensional map from a distance greater than a consistent distance later used for facet imaging.

10. The unmanned aerial vehicle of claim 1, comprising a radar sensor configured to provide range data, and wherein the processing apparatus is configured to:
  scan the roof using the radar sensor to generate the three-dimensional map of the roof.

11. The unmanned aerial vehicle of claim 1, comprising a lidar sensor configured to provide range data, and wherein the processing apparatus is configured to:
  scan the roof using the lidar sensor to generate the three-dimensional map of the roof.

12. The unmanned aerial vehicle of claim 1, wherein the processing apparatus is configured to:
  detect, while flying between poses in the sequence of scan poses, an obstacle, wherein the detection is performed based on images captured using the one or more image sensors; and
  dynamically adjust a pose of the flight path to avoid the obstacle.

13. The unmanned aerial vehicle of claim 1, wherein the processing apparatus is configured to:
  store a scan state indicating a next pose of the sequence of poses of the flight path;
  control the propulsion mechanism to cause the unmanned aerial vehicle to fly to a landing spot and land the unmanned aerial vehicle;
  after landing, control the propulsion mechanism to cause the unmanned aerial vehicle to take off from the landing spot;
  access the scan state; and
  based on the scan state, control the propulsion mechanism to cause the unmanned aerial vehicle to fly to assume a pose in the sequence of scan poses corresponding to the next pose and continue scanning the roof to generate the three-dimensional map.

14. A method comprising:
  capturing, using one or more image sensors of an unmanned aerial vehicle, an overview image of a roof of a building from a first pose of the unmanned aerial vehicle positioned above the roof;
  presenting a graphical representation of a suggested bounding polygon overlaid on the overview image to a user, wherein the suggested bounding polygon includes vertices corresponding to respective vertex icons of the graphical representation that enable the user to move the vertices within a plane;
  accessing data encoding user edits of one or more of the vertices of the suggested bounding polygon;
  determining a bounding polygon based on the suggested bounding polygon and the data encoding user edits;
  determining a flight path based on the bounding polygon, wherein the flight path includes a sequence of poses of the unmanned aerial vehicle with respective fields of view at a fixed height that collectively cover the bounding polygon;
  controlling a propulsion mechanism to cause the unmanned aerial vehicle to fly to assume a sequence of scan poses with horizontal positions matching respective poses of the flight path and vertical positions determined to maintain a consistent distance above the roof; and
  scanning the roof from the sequence of scan poses to generate a three-dimensional map of the roof.

15. The method of claim 14, comprising:
  presenting a graphical representation of the unmanned aerial vehicle overlaid on the overview image, wherein the graphical representation of the unmanned aerial vehicle corresponds to a current horizontal position of the unmanned aerial vehicle.

16. The method of claim 14, comprising:
determining the flight path based on one or more scan parameters presented for selection by the user, including one or more parameters from a set of parameters including a grid size, a nominal height above a surface of the roof, and a top flight speed.

17. The method of claim 14, wherein the flight path is determined as a lawn-mower pattern.

18. The method of claim 14, comprising:
detecting, while flying between poses in the sequence of scan poses, an obstacle, wherein the detection is performed based on images captured using the one or more image sensors; and
dynamically adjusting a pose of the flight path to avoid the obstacle.

19. The method of claim 14, comprising:
storing a scan state indicating a next pose of the sequence of poses of the flight path;
controlling the propulsion mechanism to cause the unmanned aerial vehicle to fly to a landing spot and land the unmanned aerial vehicle;
after landing, controlling the propulsion mechanism to cause the unmanned aerial vehicle to take off from the landing spot;
accessing the scan state; and
based on the scan state, controlling the propulsion mechanism to cause the unmanned aerial vehicle to fly to assume a pose in the sequence of scan poses corresponding to the next pose and continue scanning the roof to generate the three-dimensional map.

20. A non-transitory computer-readable storage medium that includes instructions that, when executed by a processor, facilitate performance of operations comprising:
capturing, using one or more image sensors of an unmanned aerial vehicle, an overview image of a roof of a building from a first pose of the unmanned aerial vehicle positioned above the roof;
presenting a graphical representation of a suggested bounding polygon overlaid on the overview image to a user, wherein the suggested bounding polygon includes vertices corresponding to respective vertex icons of the graphical representation that enable the user to move the vertices within a plane;
accessing data encoding user edits of one or more of the vertices of the suggested bounding polygon;
determining a bounding polygon based on the suggested bounding polygon and the data encoding user edits;
determining a flight path based on the bounding polygon, wherein the flight path includes a sequence of poses of the unmanned aerial vehicle with respective fields of view at a fixed height that collectively cover the bounding polygon;
controlling a propulsion mechanism to cause the unmanned aerial vehicle to fly to assume a sequence of scan poses with horizontal positions matching respective poses of the flight path and vertical positions determined to maintain a consistent distance above the roof;
scanning the roof from the sequence of scan poses to generate a three-dimensional map of the roof; and
presenting indications of progress along the flight path overlaid on the overview image.

* * * * *